(12) United States Patent  
Eguchi

(10) Patent No.: US 10,168,510 B2  
(45) Date of Patent: Jan. 1, 2019

(54) IMAGING OPTICAL SYSTEM HAVING SPECIFIED RELATIONSHIP BETWEEN FOCAL LENGTH, ABBE NUMBER, AND PARTIAL DISPERSION RATIO, AND IMAGING APPARATUS HAVING THE SAME

(71) Applicant: CANON KABUSHIKI KAISHA, Tokyo (JP)

(72) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 15/154,815

(22) Filed: May 13, 2016

(65) Prior Publication Data  
US 2016/0341958 A1 Nov. 24, 2016

(30) Foreign Application Priority Data  
May 21, 2015 (JP) ................. 2015-103559

(51) Int. Cl.  
G02B 27/00 (2006.01)  
G02B 13/02 (2006.01)  
G02B 27/64 (2006.01)  
H04N 5/232 (2006.01)  
H04N 5/225 (2006.01)  
G02B 9/26 (2006.01)  
G03B 3/00 (2006.01)  
G03B 13/32 (2006.01)  
G02B 13/00 (2006.01)

(52) U.S. Cl.  
CPC ............. G02B 13/02 (2013.01); G02B 9/26 (2013.01); *G02B 13/009* (2013.01); *G03B 3/00* (2013.01); *G03B 13/32* (2013.01); *H04N 5/23212* (2013.01)

(58) Field of Classification Search  
CPC .......... G02B 9/12–9/64; G02B 13/009; G02B 13/02; G02B 27/0025; G02B 27/646; G03B 3/00; G03B 13/32; G03B 2205/0015; H04N 5/2253; H04N 5/2254; H04N 5/23212  
USPC .... 348/208.11; 359/362, 554–557, 754–790; 369/112.01–112.29; 396/55  
See application file for complete search history.

(56) References Cited

U.S. PATENT DOCUMENTS

| 5,745,306 A | 4/1998 | Sato |
| 5,757,555 A | 5/1998 | Sato |
| 8,638,506 B2 | 1/2014 | Eguchi |

(Continued)

*Primary Examiner* — Jennifer D. Carruth  
*Assistant Examiner* — Ryan S Dunning  
(74) *Attorney, Agent, or Firm* — Canon USA Inc., IP Division

(57) ABSTRACT

A partial lens unit St includes one or more positive lenses that are appropriately set based on a focal length $f_1$ of a first lens unit, a focal length $f_2$ of a second lens unit, an overall lens length L, a focal length f of an imaging optical system of when focused on an infinite-distance object, a focal length $f_{Pi}$ of an i-th positive lens in an i-th position, among the positive lenses, counted in order from an object side to an image side, an Abbe number and an anomalous partial dispersion ratio difference $v_{dPi}$ and $\Delta\theta_{gFPi}$ of a material for the i-th positive lens, and the total number n of the positive lenses included in the one or more partial lens units St.

8 Claims, 9 Drawing Sheets

(56) References Cited

U.S. PATENT DOCUMENTS

2011/0141573 A1* 6/2011 Eguchi .................. G02B 15/10
359/675
2011/0267707 A1* 11/2011 Take .................. G02B 13/0045
359/708
2013/0021513 A1* 1/2013 Eguchi ..................... G02B 9/12
348/335

* cited by examiner

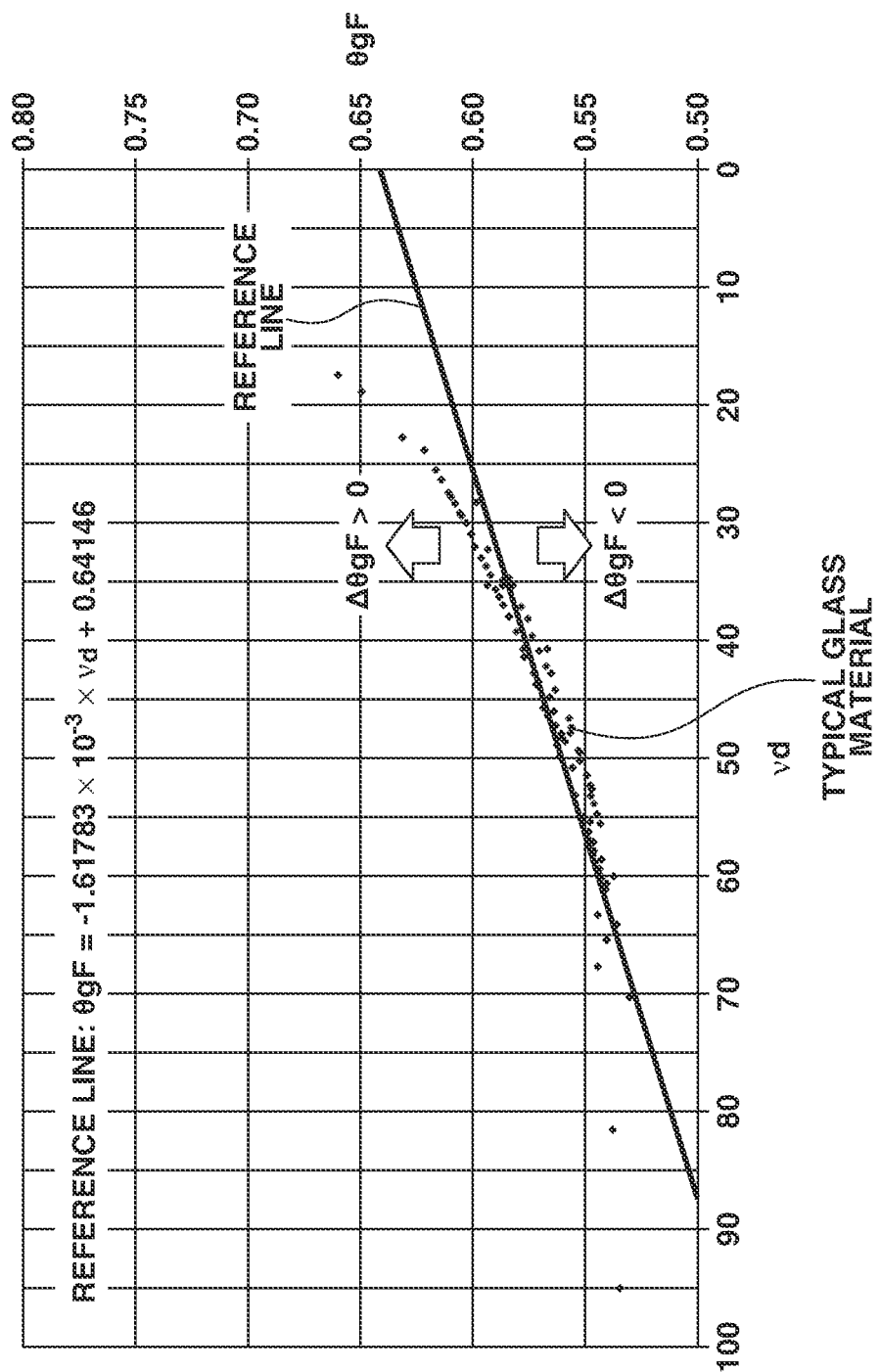

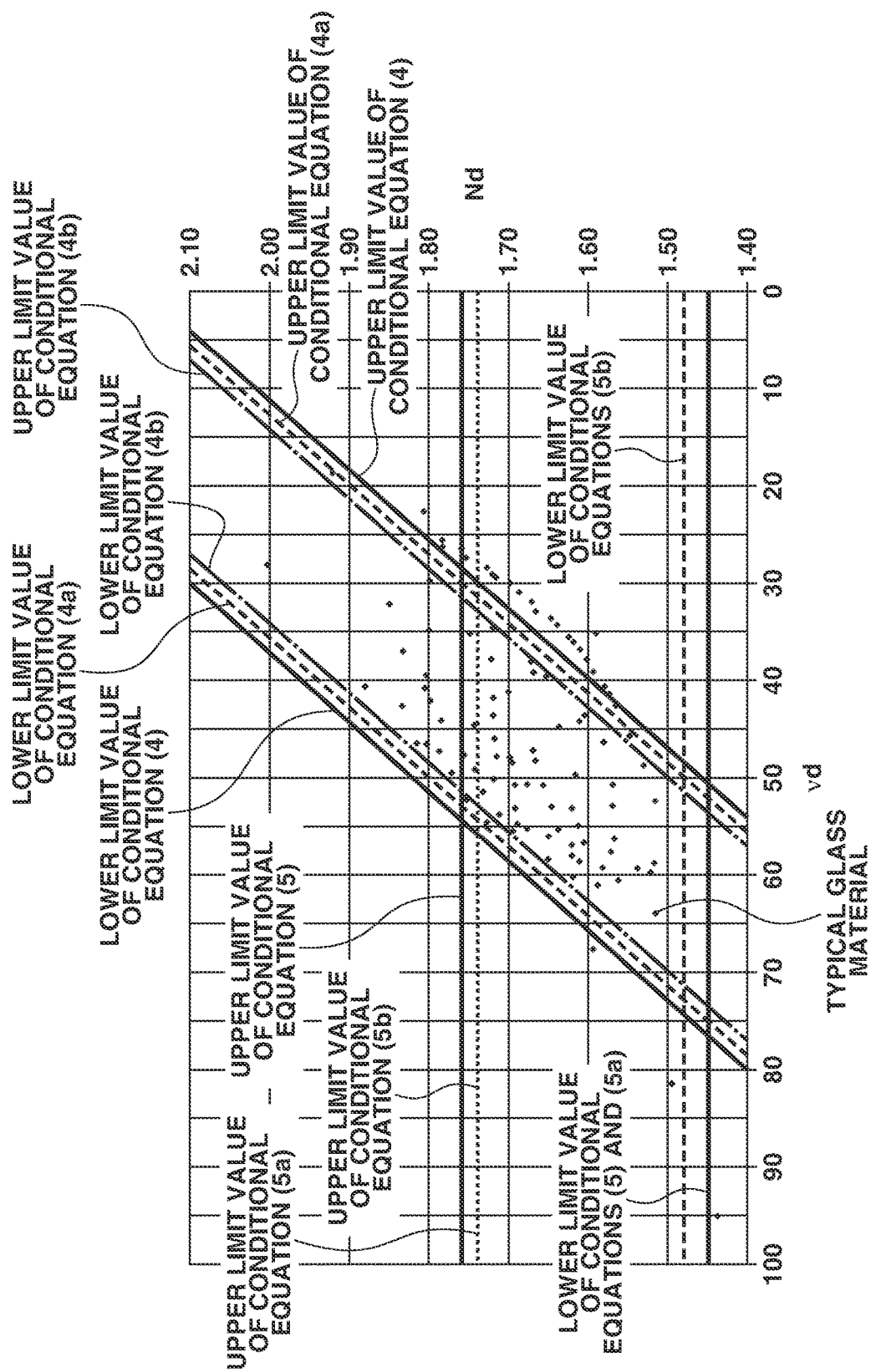

IMAGING OPTICAL SYSTEM HAVING SPECIFIED RELATIONSHIP BETWEEN FOCAL LENGTH, ABBE NUMBER, AND PARTIAL DISPERSION RATIO, AND IMAGING APPARATUS HAVING THE SAME

BACKGROUND OF THE INVENTION

Field of the Invention

The present invention relates to an imaging optical system and an imaging apparatus having the same, and is suitable, for example, for a video camera, a digital still camera, a television (TV) camera, and a monitoring camera, each of which uses an image sensor, and a film camera using a silver-halide film.

Description of the Related Art

There is known a telephoto-type imaging optical system (telephoto lens) including, in order from an object side to an image side, a front lens unit having a positive refractive power and a rear lens unit having a negative refractive power. In the telephoto lens, a large amount of chromatic aberration, particularly axial chromatic aberration and lateral chromatic aberration, occurs among a variety of aberrations as the focal length becomes longer.

U.S. Pat. No. 5,757,555 discusses a telephoto lens in which chromatic aberrations are corrected by combining a positive lens using a low dispersion material having an anomalous partial dispersion, such as fluorite or product name S-FPL51 (Ohara Inc.), with a negative lens using a high dispersion material. Further, in a telephoto lens having a small F-number, large amounts of spherical aberration and comatic aberration (coma) occur among a variety of aberrations as the F-number becomes smaller. To correct the spherical aberration and coma in a telephoto lens having a small F-number, U.S. Pat. No. 5,745,306 discusses a telephoto lens having an increased number of lenses so that the degree of freedom to the aberration corrections is increased.

Meanwhile, as a method for achieving an imaging optical system in which a variety of aberrations including the chromatic aberrations of the optical system is corrected and, at the same time, the overall lens length is shortened, there is known a method using an aspheric surface lens, an optical element having an anomalous dispersion, and a diffractive optical element having a diffraction action. With the aforementioned method, there has been provided an imaging optical system in which the chromatic aberrations and mono chromatic aberrations are favorably corrected, and at the same time, overall lens length is shortened by reduction of the number of lenses. In U.S. Pat. No. 8,638,506, the refractive power of the first lens unit is increased so that the overall lens length is shortened, and at the same time mono chromatic aberration corrections are performed in an aspheric surface and chromatic aberrations are corrected by the diffractive optical element and the optical element having an anomalous dispersion.

In many imaging optical systems, focusing from an object located at a faraway distance (infinite-distance object) to an object located at a nearby distance (near-distance object) is performed by movement of the whole or a part of the imaging optical system in an optical axis direction. In the telephoto lens, an inner focus-type focusing in which a lens unit that is relatively small and light and located at a central portion in the imaging optical system is moved is often used. The telephoto lens discussed in the above-described patent documents includes, in order from the object side, a first lens unit having a positive refractive power and a second lens unit having a negative refractive power. The second lens unit moves in focusing.

In a telephoto lens, the size of the front lens unit having a positive refractive power generally becomes larger as the focal length becomes longer. It is therefore important for the telephoto lens that a lens configuration of the front lens unit is appropriately set in order to realize downsizing and weight reduction of the lens system, while at the same time, chromatic aberrations are favorably corrected, so that a telephoto lens with high optical performance is obtained. However, if the overall lens length is substantially shortened by setting a configuration of front lens unit, correction of the axial chromatic aberration and the lateral chromatic aberration in a well-balanced manner becomes difficult. Therefore, for example, correction of chromatic aberrations becomes necessary also in a rear lens unit positioned closer to the image side than an aperture stop.

SUMMARY OF THE INVENTION

An aspect of the present invention is directed to an imaging optical system comprising, in order from an object side to an image side, a first lens unit which has a positive refractive power, a second lens unit which has a negative refractive power and moves in an optical axis direction in focusing, and a third lens unit which has a positive or a negative refractive power, and an aperture stop arranged in a position closer to the image side than the first lens unit, wherein one or more partial lens units, which are immovable during focusing and during image blur correction, each having a positive or a negative refractive power, are arranged in a position closer to the image side than the aperture stop, and wherein each of the one or more partial lens units includes one or more positive lenses, and satisfies conditional expressions:

$-2.5 < f_1/f_2 < -1,$ $3.0 < f^2/(f_1 \times L) < 8.0,$ and $$-0.0150 < \sum_{i=1}^{n} \Delta\theta_{gFPi} \times \frac{f}{f_{Pi} \times v_{dPi}} < -0.0040,$$

where a focal length of the first lens unit is $f_1$, a focal length of the second lens unit is $f_2$, an overall lens length is L, a focal length of the imaging optical system when focused on an infinite-distance object is f, a focal length of an i-th positive lens in an i-th position, among the one or more positive lenses, counted in order from the object side to the image side is $f_{Pi}$, an Abbe number and an anomalous partial dispersion ratio difference of a material for the i-th positive lens are $v_{dPi}$ and $\Delta\theta_{gFPi}$, respectively, and a total number of the one or more positive lenses included in the one or more partial lens units is n.

Further features of the present invention will become apparent from the following description of exemplary embodiments with reference to the attached drawings.

BRIEF DESCRIPTION OF THE DRAWINGS

FIGS. 6A and 6B are diagrams illustrating numerical ranges of conditional expressions (4) and (5) according to an exemplary embodiment of the present invention.

DESCRIPTION OF THE EMBODIMENTS

Figure 1A:
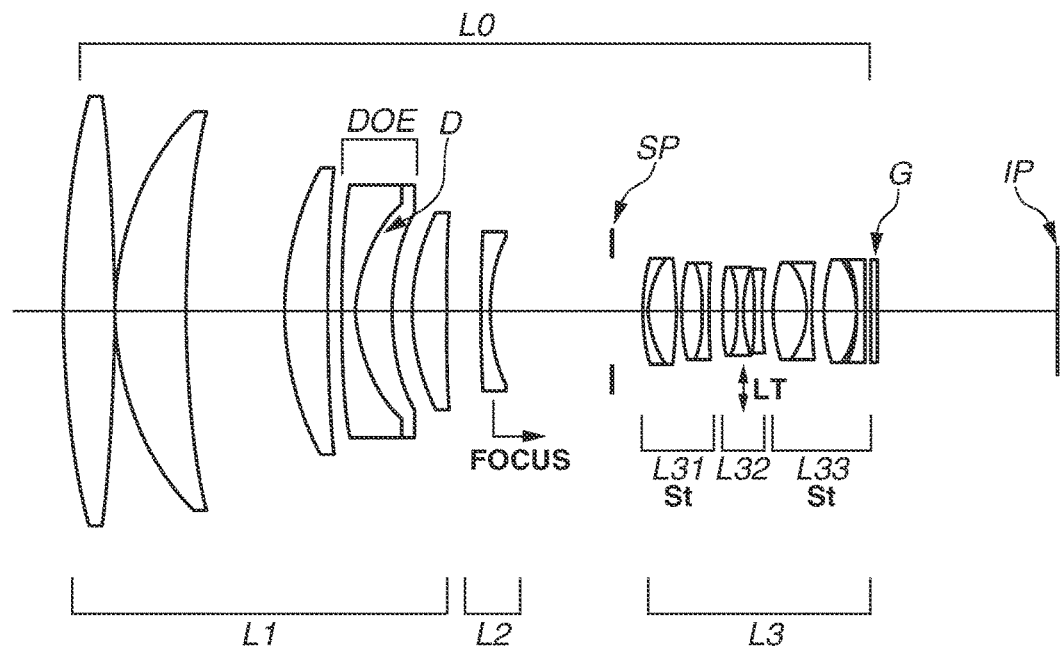
FIGS. 1A and 1B are diagrams illustrating a lens cross-sectional view and an aberration diagram, respectively, of an imaging optical system according to a first exemplary embodiment of the present invention, at a time of when focusing is performed on an infinite-distance object.
Figure 1B:
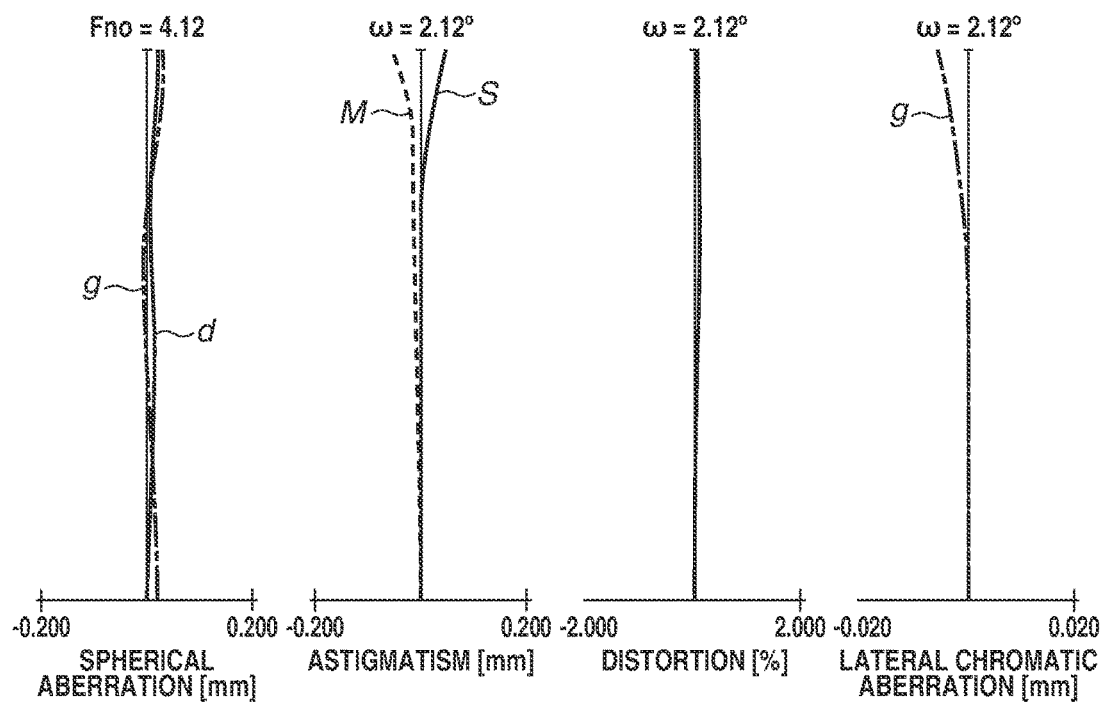

Hereinafter, exemplary embodiments of the present invention will be described with reference to the accompanying drawings. An imaging optical system of the present invention includes, in order from an object side to an image side (left to right in the drawings), a first lens unit L1, a second lens unit L2, and a third lens unit L3. The first lens unit L1 has a positive refractive power. The second lens unit L2 has a negative refractive power and moves in a direction parallel to the optical axis (in an optical axis direction) for focusing. The third lens unit L3 has a positive or a negative refractive power. The imaging optical system has an aperture stop SP on the image side of the first lens unit.

Figure 3A:
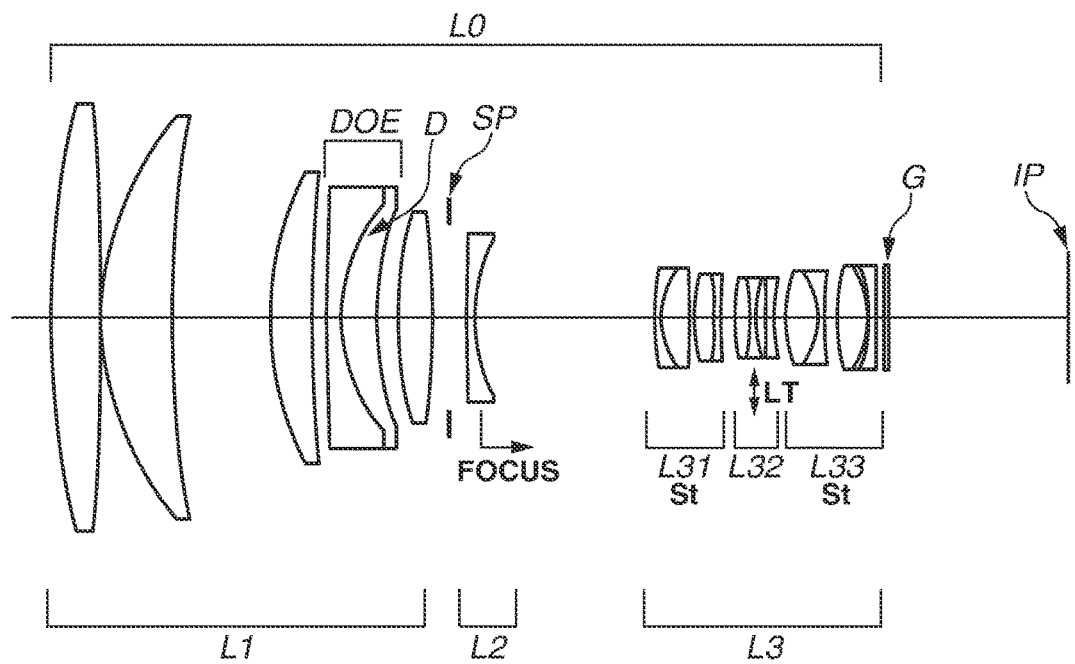
FIGS. 3A and 3B are diagrams illustrating a lens cross-sectional view and an aberration diagram, respectively, of an imaging optical system according to a third exemplary embodiment of the present invention, at a time of when focusing is performed on an infinite-distance object.
Figure 3B:
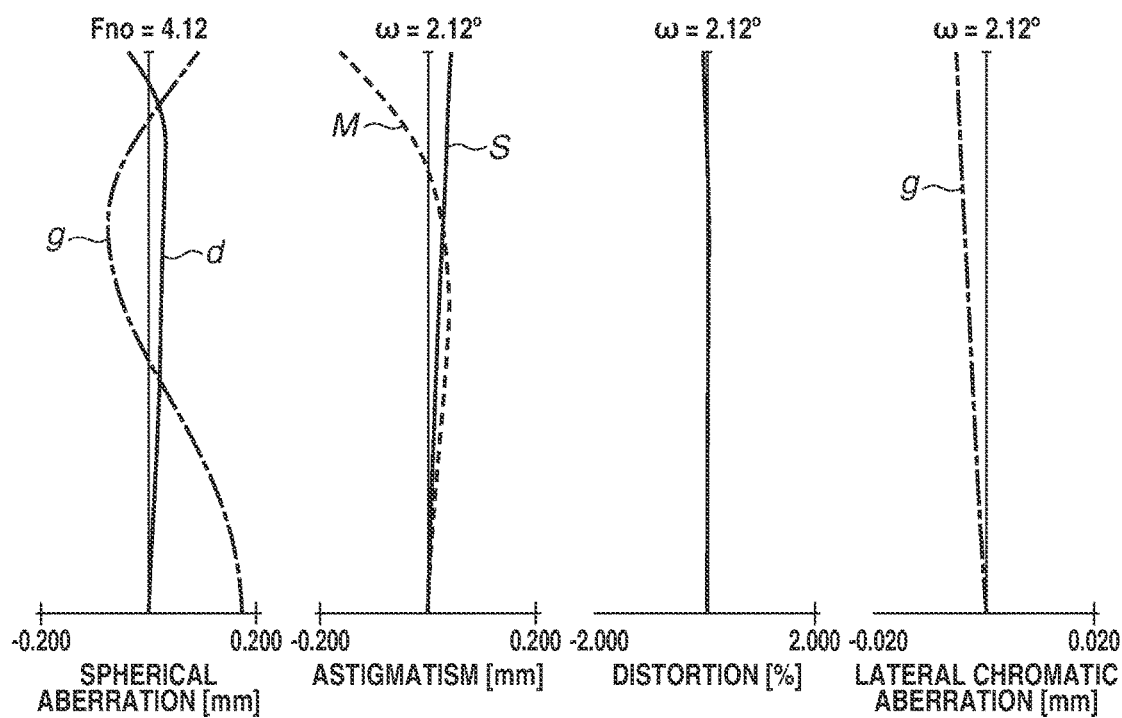
Figure 4A:
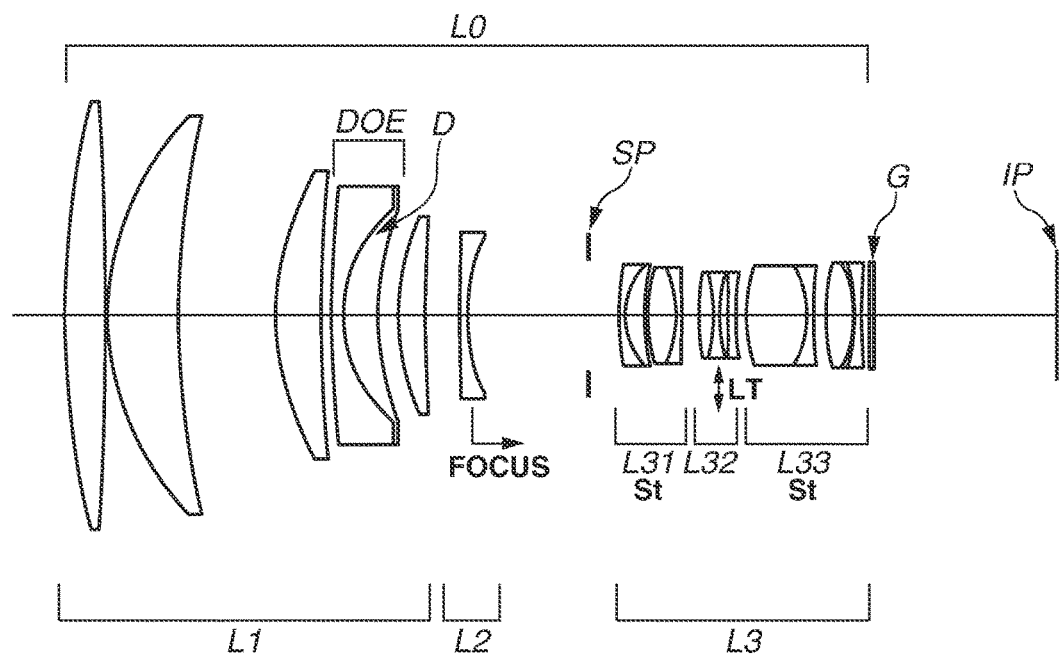
FIGS. 4A and 4B are diagrams illustrating a lens cross-sectional view and an aberration diagram, respectively, of an imaging optical system according to a fourth exemplary embodiment of the present invention, at a time of when focusing is performed on an infinite-distance object.
Figure 4B:
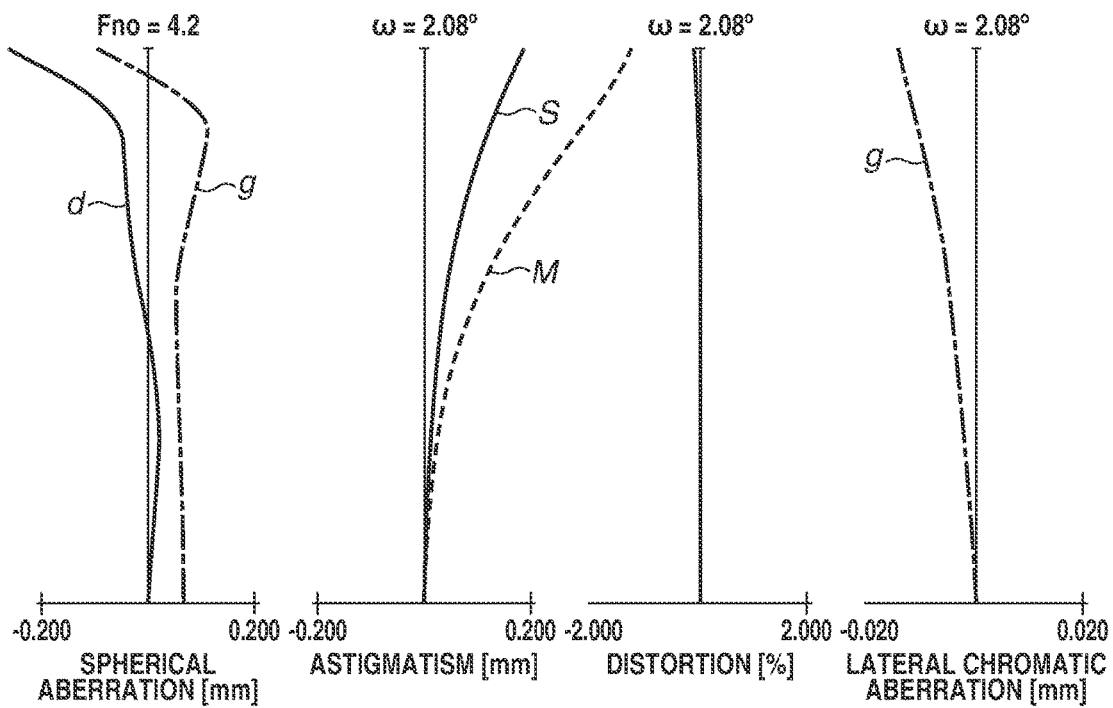
Figure 5:
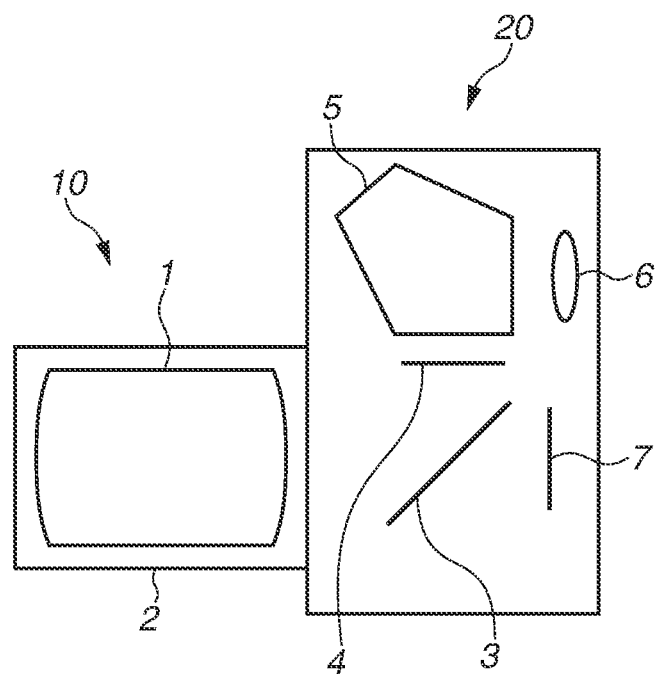
FIG. 5 is a diagram illustrating an imaging apparatus according to an exemplary embodiment of the present invention.

FIGS. 1A, 2A, 3A, and 4A are lens cross-sectional views of first, second, third, and fourth exemplary embodiments, respectively, of imaging optical systems of the present invention. Further, FIGS. 1B, 2B, 3B, and 4B are aberration diagrams of the first, second, third, and fourth exemplary embodiments, respectively, of imaging optical systems of the present invention. FIG. 5 is a schematic view of a single-lens reflex camera (imaging apparatus) in which an imaging optical system of the present invention is mounted to a camera body.

Each of the lens cross-sectional views in FIGS. 1A, 2A, 3A, and 4A illustrates an imaging optical system L0 and an aperture stop SP. The imaging optical system L0 includes a first lens unit L1 having a positive refractive power, a second lens unit L2 having a negative refractive power, and a third lens unit L3 having a positive or a negative refractive power. The third lens unit L3 includes, in order from the object side to the image side, a first partial lens unit L31, a second partial lens unit L32, and a third partial lens unit L33. The first partial lens unit L31 is immovable. The second partial lens unit L32 is for image blur correction and moves in a direction having a vertical direction component to an optical axis in image blur correction. The third partial lens unit L33 is immovable.

Here, immovable means that the first partial lens unit L31 and the third partial lens unit L33 are arranged to be not moved (i.e., fixed) in focusing and in image blur correction. The lens cross-sectional views further illustrate a glass block G (e.g., an optical filter), a diffractive optical element DOE, a diffractive optical part D, and an image plane IP. The image plane IP corresponds to an imaging plane of an image sensor (photoelectric conversion device), such as a charge-coupled device (CCD) sensor or a complementary metal oxide semiconductor (CMOS) sensor, that receives an image when the imaging optical system is used as an imaging optical system of a video camera or a digital camera. Further, the image plane IP corresponds to a film plane of a silver-halide film camera when the imaging optical system is used as an imaging optical system of the silver-halide film camera.

Each of the aberration diagrams in FIGS. 1B, 2B, 3B, and 4B illustrates a d-line (indicated as "d"), a g-line (indicated as "g"), a meridional image plane (indicated as "M") of the d-line, and a sagittal image plane (indicated as "S") of the d-line. The lateral chromatic aberration is represented by the g-line with respect to the d-line. In each of the aberration diagrams, "Fno" is the F-number and "ω" is the half angle of view (degree). In all of the aberration diagrams, the spherical aberration is shown between −0.2 mm and 0.2 mm, the astigmatism is shown between −0.2 mm and 0.2 mm, the distortion is shown between −2% and 2%, and the lateral chromatic aberration is shown between −0.02 mm and 0.02 mm, where the numerical data described below are expressed in units of mm.

The imaging optical system L0 of the exemplary embodiments is a telephoto lens, and a characteristic configuration thereof is as follows. The imaging optical system L0 of the exemplary embodiments includes, in order from the object side to the image side, the first lens unit L1, the second lens unit L2, and the third lens unit L3. The first lens unit L1 has a positive refractive power. The second lens unit L2 has a negative refractive power and moves in an optical axis direction in focusing. The third lens unit L3 has a positive or a negative refractive power. The imaging optical system L0 includes an aperture stop SP positioned closer to the image side than the first lens unit L1. The imaging optical system L0 further includes one or more partial lens units St, each having a positive or a negative refractive power, that are immovable in focusing and image blur correction. The one or more partial lens units St are arranged in a position closer to the image side than the aperture stop SP. The partial lens unit St includes one or more positive lenses.

Assume that a focal length of the first lens unit L1 is $f_1$, a focal length of the second lens unit L2 is $f_2$, and an overall lens length is L, a focal length of the imaging optical system when focusing is performed on an infinite-distance object is f, a focal length of an i-th positive lens in the i-th position, among the positive lenses, counted in order from the object side to the image side, is $f_{Pi}$, an Abbe number and an anomalous partial dispersion ratio difference of material of the i-th positive lens are $v_{dPi}$ and $\Delta\theta_{gFPi}$, respectively, and the total number of the positive lenses included in the partial lens unit St (when there is a plurality of the partial lens units St, the total number of the positive lenses included in the plurality of partial lens units St) is n, the following conditional expressions are satisfied:

$$-2.5 < f_1/f_2 < -1.0 \tag{1},$$

$$3.0 < f^2/(f_1 \times L) < 8.0 \tag{2, and}$$

$$-0.0150 < \sum_{i=1}^{n} \Delta\theta_{gFPi} \times \frac{f}{f_{Pi} \times v_{dPi}} < -0.0040. \tag{3}$$

Here, the overall lens length is a value obtained by adding a value of a back focus BF (in air) to a length on the optical axis from a vertex of a lens surface of a lens positioned closest to the object side to a lens surface on the image side of the lens closest to the image side. Further, an Abbe number $\nu_d$ and an anomalous partial dispersion ratio difference $\Delta\theta_{gF}$ of the material are defined by the following expressions:

$$\nu_d = (N_d - 1)/(N_F - N_C),$$

$$\theta_{gF} = (N_g - N_F)/(N_F - N_C), \text{ and}$$

$$\Delta\theta_{gF} = \theta_{gF} - (-1.61783 \times 10^{-3} \times \nu_d + 0.64146),$$

where a refractive index of the material in the d-line is $N_d$, a refractive index in the g-line is Ng, a refractive index in a C-line is $N_C$, and a refractive index in an F-line is $N_F$.

Figure 8:
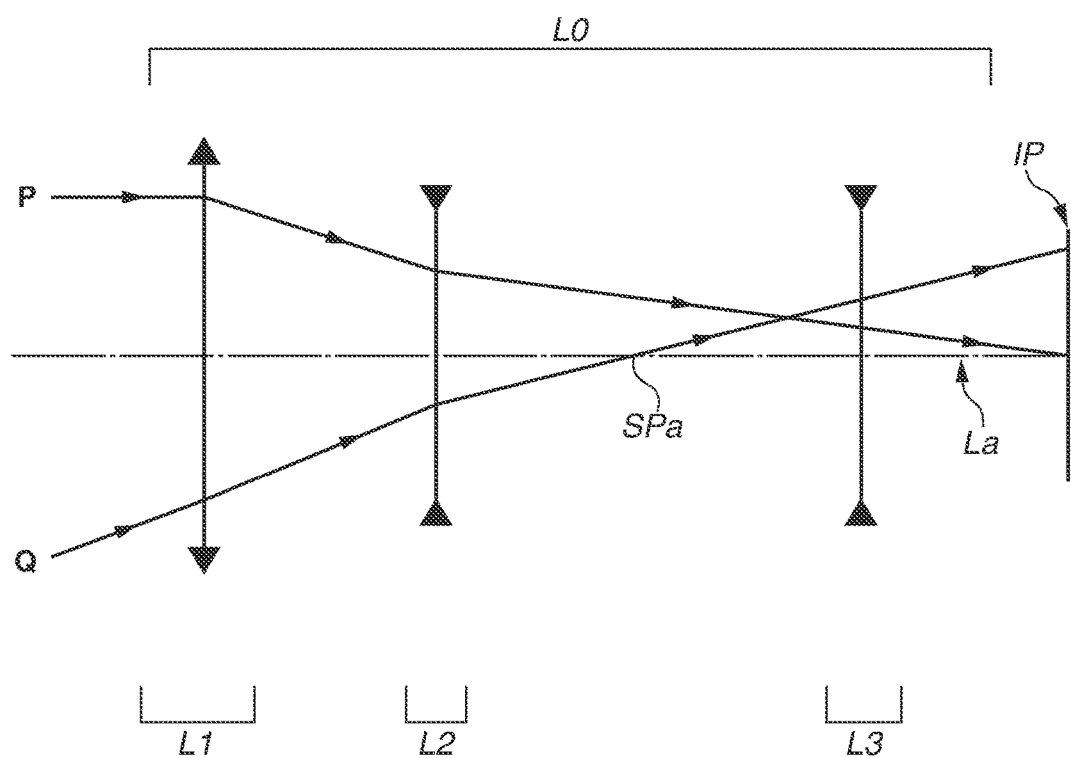
FIG. 8 is a schematic view of paraxial arrangement for describing an optical action of an imaging optical system according to an exemplary embodiment of the present invention.

FIG. 8 is a schematic view of paraxial refractive power arrangement of the imaging optical system L0 of the exemplary embodiments. FIG. 8 illustrates the paraxial refractive power arrangement for describing an optical action in a reference state (when focusing is performed on an infinite object) in a case where a rear focusing (inner focusing) method is employed in the imaging optical system L0. In FIG. 8, the first lens unit L1 has a positive refractive power, the second lens unit L2 has a negative refractive power and moves in the optical axis direction in focusing, and the third lens unit L3 has a positive or a negative refractive power. Further, FIG. 8 illustrates an optical axis La of the imaging optical system L0, an image plane IP, an axial paraxial ray P, and a chief paraxial ray Q.

In a telephoto lens, an incident height of the axial paraxial ray P on a lens arranged on the object side of a point Spa is higher than an incident height of the axial paraxial ray P on a lens arranged on the image side of the point Spa, where the optical axis La and the chief paraxial ray Q intersects at the point Spa. The telephoto lens has such a telephoto type configuration. In this configuration, in a case where a large aperture (a decrease in the F-number) is effectively achieved, the value of the F-number (full aperture F-number) is determined by a lens effective diameter near the object side.

In the telephoto lens, a lens positioned closer to the object side has a larger effective diameter. Especially, if the F-number becomes smaller, the effective diameter of the lens on the object side is increased. Accordingly, the effective diameter of the lens on the object side is increased and the outer diameter of the lens is increased. Further, the weight of the lens is increased approximately with the cube thereof. Therefore, a telephoto lens having a larger aperture ratio is more easily increased in the weight of the lens on the object side than the image side. From the reasons above, it becomes important to achieve weight reduction of the lens system in the telephoto lens having a large aperture ratio. To reduce the weight of the lens system in these circumstances, it becomes necessary to shorten the overall lens length, reduce the number of configuration lenses of the first lens unit, and decrease the lens effective diameter without changing in the specification and imaging performance.

In order that downsizing and weight reduction of the lens system is achieved in the telephoto-type lens configuration, the overall lens length is shortened in the imaging optical system of the exemplary embodiments. The method for shortening the overall lens length is discussed in U.S. Pat. No. 8,638,506. It is the method in which an aspheric surface lens and an anomalous dispersion material are used for the first lens unit to enhance aberration correctability, whereby the refractive power of the first lens unit is increased and the thickness (the length in the optical axis direction) of the first lens unit itself is reduced.

In this case, when the overall lens length is shortened in a telephoto lens having a long focal length f of the imaging optical system and a small F-number Fno (a ratio f/Fno of the focal length f and the F-number Fno is large), the issues described below arise. The examples of such telephoto lenses include a telephoto lens having a focal length f=600 mm and an F-number Fno=4.0, and a telephoto lens having a focal length f=800 mm and an F-number Fno=5.6.

Fluorite and a diffractive optical element are used for an optical element that configures the first lens unit, and the power of the first lens unit is increased while the chromatic aberration is corrected, and the overall lens length is shortened to a certain extent or more. In doing so, correction of the axial chromatic aberration and the lateral chromatic aberration in a well-balanced manner becomes difficult. For example, if the lateral chromatic aberration is corrected in such a telephoto lens, the axial chromatic aberration is corrected in an excessive manner. Especially, favorable correction of the axial chromatic aberration between the g-line and the F-line becomes difficult.

In an image having image quality corresponding to normal full high vision (the number of pixels: 1920×1080, the pixel size: several μm), some chromatic aberrations may be acceptable. However, if high image quality achieved by increase in the number of pixels and reduction of the pixel size is taken into consideration, sufficient correction of the axial chromatic aberration and the lateral chromatic aberration becomes necessary. As a method for correcting the chromatic aberrations of the telephoto lens, there is known a method in which the axial chromatic aberration and the lateral chromatic aberration are corrected in the first lens unit, and a residual chromatic aberration that has not been corrected in the first lens unit, is corrected in a lens unit positioned closer to the image side than the aperture stop.

A method for correcting the lateral chromatic aberration in a lens unit positioned closer to the image side than the aperture stop will be described. To correct the lateral chromatic aberration between the C-line and the F-line, it is favorable to use a high dispersion material for the material of the positive lens and a low dispersion material for the material of the negative lens. Further, a straight line expressed by:

$$\theta_{gF} = -1.61783 \times 10^{-3} \times \nu_d + 0.64146$$

is defined as a "reference line", in a graph expressed by a horizontal axis $\nu_d$ and a vertical axis $\theta_{gF}$.

FIG. 6A illustrates the reference line. It is favorable to use a material distributed below the reference line ($\Delta\theta_{gF} < 0$) for the positive lens, and use a material distributed above the reference line ($\Delta\theta_{gF} > 0$) for the negative lens. In doing so, correction of the lateral chromatic aberration between the g-line and the F-line becomes easy. However, if a high dispersion material is used for the positive lens, as illustrated in the $\theta_{gF}$–$\nu_d$ graph of FIG. 6A, the material has a larger value in the anomalous partial dispersion ratio difference $\Delta\theta_{gF}$ in a positive direction as the dispersion becomes higher. If so, although the lateral chromatic aberration between the C-line and the F-line can be corrected, the lateral chromatic aberration between the g-line and the F-line is increased.

Therefore, as a balanced solution for correcting the lateral chromatic aberrations between the C-line and the F-line and between the g-line and the F-line, the following configuration has been conventionally employed, taking a glass material manufactured by Ohara Inc., as an example. TIL-based, TIM-based, and TIH-based glass materials are often used for the positive lenses positioned closer to the image side than the aperture stop, and LAH-based and LAL-based materials and a material having an anomalous dispersion, such as FPM2, are used for the negative lenses. However, if the overall lens length is shortened in the telephoto lens, the refractive power of not only the first lens unit but also the lens units positioned closer to the image side than the aperture stop is increased. Here, assume that a telephoto ratio is the telephoto ratio=(the overall lens length)/(the focal length of the imaging optical system when focusing is performed on an infinite-distance object).

Then, if the overall lens length is shortened to the extent that the telephoto ratio falls below 0.6, along also with a significant effect due to the anomalous partial dispersion ratio difference $\Delta\theta_{gF}$ of the material used for the positive lenses positioned closer to the image side than the aperture stop, the lateral chromatic aberration between the g-line and the F-line in the imaging optical system remains. This is because most anomalous dispersions in the TIL-based, TIM-based, and TIH-based materials satisfy $\Delta\theta_{gF}>0$.

Therefore, in the exemplary embodiments of the present invention, the overall lens length is shortened in such a manner that the conditional expressions (1) and (2) are satisfied, and also, the following configuration is provided. That is, in the immovable partial lens unit St positioned closer to the image side than the aperture stop SP, the material and the refractive power of the positive lenses are appropriately set in a manner such that the conditional expression (3) is satisfied. Accordingly, the lateral chromatic aberration between the g-line and the F-line is favorably corrected.

A mechanism of correction of the chromatic aberration will be described. In the telephoto lens L0 as illustrated in the model of the paraxial refractive power arrangement of FIG. 8, the axial paraxial ray P passes the lens surface at a high position with respect to the optical axis La, on the side closer to the object side than the position SPa where the chief paraxial ray Q intersects with the optical axis La. Therefore, the axial chromatic aberration occurs more than the axial chromatic aberration in the lenses on the image side. Further, since an off-axis principal ray passes a peripheral portion of the lenses as increasing distance, toward the object side (or the image side) from the position SPa where the chief paraxial ray Q intersects with the optical axis La, large lateral chromatic aberrations occur.

Therefore, a lens made of a material having an anomalous dispersion and an optical element, such as a diffractive optical element, for correction of chromatic aberrations are arranged in a position closer to the object side than the position SPa where the chief paraxial ray Q intersects with the optical axis La (especially, in the first lens unit). Accordingly, both of the axial chromatic aberration and the lateral chromatic aberration are favorably corrected. In doing so, in the exemplary embodiments, the respective chromatic aberrations between the C-line and the F-line and between the g-line and the F-line of the axial chromatic aberration and the lateral chromatic aberration are corrected.

However, if the positive refractive power of the first lens unit is increased in order that the overall lens length is shortened, the chromatic aberration amount between the g-line and the F-line is especially increased. This is because, in a typical optical material used for lenses, change of the refractive index becomes larger as the wavelength becomes shorter although the magnitude of the change differs depending on the difference in dispersion, as illustrated in FIG. 7.

Figure 7:
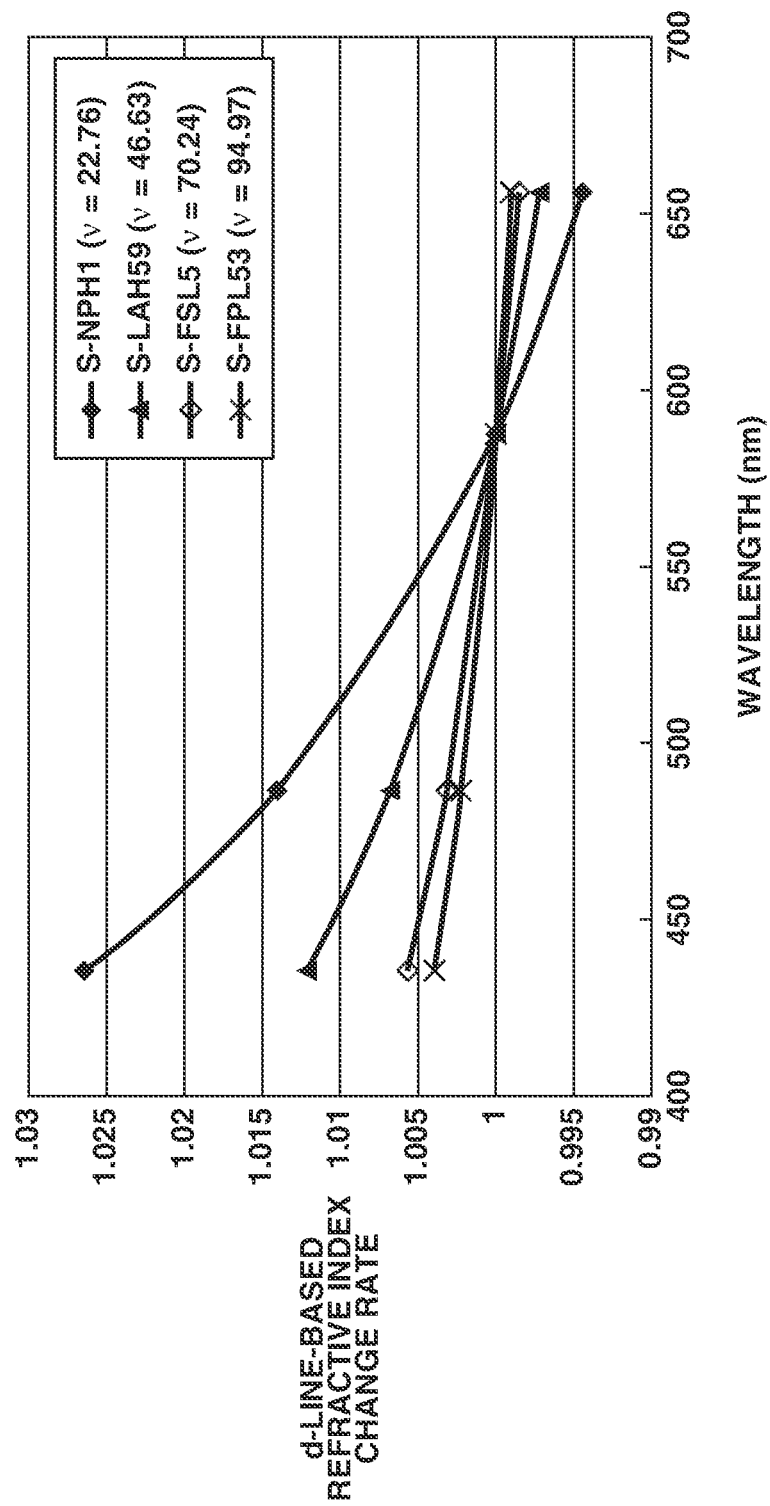
FIG. 7 is a graph illustrating a refractive index change rate according to wavelengths of typical glass materials.

FIG. 7 illustrates the refractive indices according to wavelengths of typical materials. For the positive lens in the first lens unit, a material having a large anomalous dispersion is often used in order that both of the chromatic aberrations between the C-line and the F-line and between the g-line and the F-line of the axial chromatic aberration and the lateral chromatic aberration are corrected in a well-balanced manner.

The positive refractive power of the first lens unit is further increased for shortening of the overall lens length. In doing so, contribution rates of correction of the axial chromatic aberration and the lateral chromatic aberration are different, and thus correction of the chromatic aberrations of four wavelengths including d, g, C, and F about both of the axial chromatic aberration and the lateral chromatic aberration are difficult only with the material and the diffractive optical element arranged in the first lens unit. Especially, if the axial chromatic aberration is sufficiently corrected, the correction of the lateral chromatic aberration between g-line and the F-line becomes insufficient. Thus, correction of both of the axial chromatic aberration and the lateral chromatic aberration becomes difficult only in the first lens unit.

Therefore, in the exemplary embodiments, the positive lenses are arranged in such a manner that the conditional expression (3) is satisfied, in the immovable partial lens unit St positioned closer to the image side than the aperture stop SP. Accordingly, the lateral chromatic aberration between the g-line and the F-line is corrected in the positive lenses. In doing so, in the exemplary embodiments, the imaging optical system which can provide a high-quality image is configured such that the chromatic aberrations are corrected, and also, downsizing and weight reduction as a whole are achieved. In this case, the aperture stop SP is arranged in the position closer to the image side than the first lens unit L1. In doing so, light fluxes sufficiently incident on higher image heights without increase of the lens effective diameter of the first lens unit L1.

Further, in focusing in many of imaging optical systems, focusing is performed by moving the imaging optical system, or moving a part of the lens units of the imaging optical system. Among the imaging optical systems, in a case of a telephoto lens having a long focal length and a small F-number (full aperture F-number), the lens system is large, and the weight of such a telephoto lens is heavier than a telephoto lens having a large F-number. Therefore, focusing performed by moving the telephoto lens becomes mechanistically difficult. Therefore, the imaging optical system of the exemplary embodiments of the present invention performs focusing by moving, on the optical axis, the second lens unit L2 that is a light and small lens unit positioned closer to the image side than the first lens unit L1.

Accordingly, the imaging optical system of the exemplary embodiments make focusing easier with a substantially smaller drive device than the case of focusing performed by moving the imaging optical system or the first lens unit L1. If a torque necessary for the drive device is small, downsizing of the drive device itself becomes easy. As a result, downsizing of the lens system becomes easy. Further, in the imaging optical system of the exemplary embodiments, the third lens unit L3 is arranged in a position closer to the image side than the second lens unit L2. By arranging the third lens unit L3 in a position closer to the image side than the second lens unit L2, the lens surface can be arranged in a place where the incident height of an on-axis ray to the lens becomes low, and the off-axis principal ray passes a high position. Accordingly, correction of a curvature of field and the lateral chromatic aberration becomes easy.

Technical meaning of the above-described conditional expressions will be described. The conditional expression (1) relates to the focal length of the first lens unit L1 and the focal length of the second lens unit L2, which configure the imaging optical system L0. When the focal length of the first lens unit L1 becomes short or a negative focal length of the second lens unit L2 becomes long (an absolute value becomes large) beyond an upper limit value of the conditional expression (1), there is an effect for the shortening of the overall lens length.

However, large amounts of spherical aberrations and comas occur in the first lens unit L1, and correction of the variety of aberrations within the first lens unit L1 becomes difficult. Thus, correction of the spherical aberrations and the comas becomes insufficient in the imaging optical system, which is not favorable. Further, if the negative focal length of the second lens unit L2 becomes long (the absolute value becomes large), a focus moving amount in focusing on a finite-distance object is increased. If so, a space for the focusing needs to be kept in the lens system in advance, and shortening of the overall lens length becomes difficult. Therefore, it is not favorable.

Meanwhile, if the focal length of the first lens unit L1 becomes long or the negative focal length of the second lens unit L2 becomes short beyond a lower limit value of the conditional expression (1), shortening of the overall lens length becomes difficult. Further, if the negative focal length of the second lens unit L2 becomes short, the focus moving amount becomes short, but variation of the spherical aberration and the coma becomes large in focusing by the amount of an increase in the negative refractive power. Therefore, it is not favorable.

The conditional expression (1) is more favorably set as follows:

$$-2.0 < f_1/f_2 < -1.0 \quad (1a).$$

Further, the conditional expression (1a) is more favorably set as follows:

$$-1.6 < f_1/f_2 < -1.0 \quad (1b)$$

The conditional expression (2) relates to the overall lens length of the imaging optical system L0 and the focal length of the first lens unit L1. if the overall lens length becomes too short or the focal length of the first lens unit L1 becomes too short beyond an upper limit value of the conditional expression (2), downsizing of the lens system becomes advantageous. However, large amounts of spherical aberrations and comas occur in the first lens unit L1, and correction of the variety of aberrations becomes difficult and thus it is not favorable. Further, if the overall lens length becomes long beyond the lower limit value of the conditional expression (2), downsizing of the lens system becomes difficult. The conditional expression (2) is more favorably set as follows:

$$4.0 < f^2/(f_1 \times L) < 7.0 \quad (2a).$$

Further, the conditional expression (2a) is more favorably set as follows:

$$4.5 < f^2/(f_1 \times L) < 6.0 \quad (2b).$$

The conditional expression (3) relates to correctability of the chromatic aberrations of the positive lenses included in the immovable partial lens unit St. If the value exceeds an upper limit value (or a lower limit value) of the conditional expression (3), the total sum of the correctability of the chromatic aberrations of the positive lenses becomes too small (or too large). If so, correction of the lateral chromatic aberration and the axial chromatic aberration in a well-balanced manner becomes difficult. Especially, correction of the lateral chromatic aberrations between the g-line and the F-line becomes difficult. The conditional expression (3) is more favorably set as follows:

$$-0.0150 < \sum_{i=1}^{n} \Delta\theta_{gFPi} \times \frac{f}{f_{Pi} \times v_{dPi}} < -0.0050. \quad (3a)$$

Further, the conditional expression (3a) is more favorably set as follows:

$$-0.0100 < \sum_{i=1}^{n} \Delta\theta_{gFPi} \times \frac{f}{f_{Pi} \times v_{dPi}} < -0.0055. \quad (3b)$$

Although, by employing the above configuration, the imaging optical system according to the present invention can be achieved, it is more favorable to satisfy one or more conditional expressions described below. Accordingly, the overall lens length can be further shortened, and high optical performance can be easily obtained. Assume that a refractive index of each material of all of the positive lenses included in the partial lens unit St is $N_{dP}$, and an Abbe number is $v_{dP}$, the focal length of the imaging optical system when focusing is performed on an infinite-distance object is f, and the focal length of the third lens unit L3 is $f_3$.

Assume further that a combined focal length of the first lens unit L1 and the second lens unit L2 when focusing is performed on an infinite-distance object is $f_{12}$, a focal length of a j-th negative lens, which is among one or more negative lenses included in the partial lens unit St and is in the j-th position, among the one or more negative lenses, counted in order from the object side to the image side, is $f_{Nj}$, an Abbe number and an anomalous partial dispersion ratio difference of the material that configures the j-th negative lens are $v_{dNj}$ and $\Delta\theta_{gFNj}$, and the total number of the negative lenses included in the partial lens unit St (when there is a plurality of the partial lens units St, the total number of the negative lenses included in all of the partial lens units St) is m.

In such a case, it is favorable that one or more of the following conditional expressions are satisfied:

$$-0.014 \times v_{dP} + 2.16 < N_{dP} < -0.014 \times v_{dP} + 2.52 \quad (4),$$

$$1.45 < N_{dP}p < 1.76 \quad (5),$$

$$-15.0 < f^2/(f_1 \times f_3) < -4.0 \quad (6),$$

$$2.0 < f^2/(f_{12} \times L) < 10.0 \quad (7), \text{ and}$$

$$0.10 < \frac{\sum_{i=1}^{n} \Delta\theta_{gFPi} \times \frac{f}{f_{Pi} \times v_{dPi}}}{\sum_{j=1}^{m} \Delta\theta_{gFNj} \times \frac{f}{f_{Nj} \times v_{dNj}}} \times 2.00. \quad (8)$$

Technical meaning of the above conditional expressions will be described. The conditional expression (4) relates to the refractive index and the Abbe number of the material for the positive lenses included in the immovable partial lens unit St. If the overall lens length is shortened in the telephoto lens, the refractive power (an absolute value of the refractive power) is increased not only in the first lens unit L1 but also in other lens units. If so, the refractive powers of the positive lenses and the negative lenses that are included in the lens units are also increased.

As described above, it is favorable that a high dispersion material is used for the positive lenses included in the partial lens unit St in terms of correction of the lateral chromatic aberration between the C-line and the F-line. However, the high dispersion glass material generally tends to have a smaller transmittance in a short wavelength range (in a wavelength range from about 380 to 410 nm). If such high dispersion glass is used for a positive lens having a large refractive power (the central thickness is large), the transmittance in the short wavelength range is decreased and unbalance in color occurs, and thus it is not favorable.

If the value exceeds a lower limit value of the conditional expression (4), unbalance in color occurs due to the decrease in the transmittance in the short wavelength side by the material for the positive lenses and thus it is not favorable. Meanwhile, if the value exceeds an upper limit value of the conditional expression (4), the material for the positive lenses has too low dispersion. If so, correction of the lateral chromatic aberration between the C-line and the F-line becomes difficult. Further, the anomalous partial dispersion ratio difference $\Delta\theta_{gF}$ becomes $\Delta\theta_{gF}>0$, and thus the lateral chromatic aberration between the g-line and the F-line is increased and it is not favorable.

The conditional expression (4) is more favorably set as follows:

$$-0.014 \times v_{dP} + 2.18 < N_{dP} < -0.014 \times v_{dP} + 2.50 \qquad (4a).$$

The conditional expression (4a) is more favorably set as follows:

$$-0.014 \times v_{dP} + 2.20 < N_{dP} < -0.014 \times v_{dP} + 2.48 \qquad (4b).$$

A range of the refractive index $N_{dP}$ regarding the conditional expression (4) is illustrated in FIG. 6B. The conditional expression (5) relates to the refractive index of the material for the positive lenses included in the partial lens unit St. If the value exceeds an upper limit value of the conditional expression (5), the refractive index becomes too large and the Petzval sum is increased in a negative direction. Therefore, correction of the curvature of imaging plane becomes difficult, and thus it is not favorable. Meanwhile, if the value exceeds a lower limit value, the Petzval sum becomes small but the refractive index is low. Therefore, a radius of curvature of the lens surface for obtaining the same refractive power becomes too small. If so, large amounts of spherical aberrations and comas occur from there, and correction of the variety of aberrations becomes difficult. Therefore, it is not favorable. The conditional expression (5) is more favorably set as follows:

$$1.45 < N_{dP} < 1.75 \qquad (5a).$$

Further, the conditional expression (5a) is more favorably set as follows:

$$1.48 < N_{dP} < 1.75 \qquad (5b).$$

A range of the refractive index $N_{dP}$ regarding the conditional expression (5) is illustrated in FIG. 6B. The conditional expression (6) relates to the focal lengths of the first lens unit L1 and the third lens unit L3. If the focal length of the first lens unit L1 of the third lens unit L3 becomes too long (an absolute value of the focal length becomes too large) beyond an upper limit value of the conditional expression (6), the entire length of the imaging optical system becomes too long, and downsizing of the lens system becomes difficult.

Meanwhile, if the focal length of the first lens unit L1 or the third lens unit L3 becomes too short (the absolute value of the focal length becomes too small) beyond a lower limit value, shortening of the overall lens length becomes advantageous. However, if the focal length of the first lens unit L1 becomes too short, large amounts of spherical aberrations and comas occur. Further, if a negative focal length of the third lens unit L3 becomes too short, large amounts of comas and astigmatism occur. If so, correction of the variety of aberrations becomes difficult, and thus it is not favorable. The conditional expression (6) is more favorably set as follows:

$$-14.0 < f^2/(f_1 \times f_3) < -6.0 \qquad (6a).$$

Further, the conditional expression (6a) is more favorably set as follows:

$$-13.0 < f^2/(f_1 \times f_3) < -7.0 \qquad (6b).$$

Further, the conditional expression (6b) is more favorably set as follows:

$$-12.0 < f^2/(f_1 \times f_3) < -7.5 \qquad (6c).$$

The conditional expression (7) relates to a combined focal length of the first lens unit L1 and the second lens unit L2 when focusing is performed on an infinite-distance object and the overall lens length. If the combined focal length of the first lens unit L1 and the second lens unit L2 becomes too short, or the overall lens length becomes too short beyond an upper limit value of the conditional expression (7), the refractive powers of the lens units become too large. If so, the spherical aberration and the coma are increased, and correction of the variety of aberrations becomes difficult, and thus it is not favorable. If the overall lens length becomes long beyond a lower limit value, downsizing becomes difficult. The conditional expression (7) is more favorably set as follows:

$$2.2 < f^2/(f_{12} \times L) < 6.0 \qquad (7a).$$

Further, the conditional expression (7a) is more favorably set as follows:

$$2.3 < f^2/(f_{12} \times L) < 4.5 \qquad (7b).$$

The conditional expression (8) is for correction of the chromatic aberrations due to the positive lenses and the negative lenses included in the partial lens unit St in a well-balanced manner. If the value exceeds an upper limit value or a lower limit value of the conditional expression (8), correction of the lateral chromatic aberration and the axial chromatic aberration between the g-line and the F-line in a well-balanced manner becomes difficult. The conditional expression (8) is more favorably set as follows:

$$0.20 < \frac{\sum_{i=1}^{n} \Delta\theta_{gFPi} \times \frac{f}{f_{Pi} \times v_{dPi}}}{\sum_{j=1}^{m} \Delta\theta_{gFNj} \times \frac{f}{f_{Nj} \times v_{dNj}}} < 1.60. \qquad (8a)$$

Further, the conditional expression (8a) is more favorably set as follows:

$$0.30 < \frac{\sum_{i=1}^{n} \Delta\theta_{gFPi} \times \frac{f}{f_{Pi} \times v_{dPi}}}{\sum_{j=1}^{m} \Delta\theta_{gFNj} \times \frac{f}{f_{Nj} \times v_{dNj}}} < 1.40. \qquad (8b)$$

As described above, according to the exemplary embodiments, the imaging optical system that favorably corrects the chromatic aberrations throughout the entire image, and has high optical performance can be obtained.

In the exemplary embodiments, the third lens unit L3 includes, in order from the object side to the image side, a first partial lens unit St, a second partial lens unit LT, and a third partial lens unit St. The first partial lens unit St is immovable. The second partial lens unit LT moves in a direction having a vertical direction component to the optical axis in image blur correction. The third partial lens unit St is immovable. With the third lens unit L3 having such a configuration such that the third lens unit L3 includes the immovable partial lens units and the movable partial lens unit, decrease in imaging performance at the time of image blur correction is prevented. In this case, the immovable partial lens units St are the first partial lens unit St and the third partial lens unit St.

The lens configurations of the exemplary embodiments will be described. In the following descriptions, lenses having the same reference characters as the reference characters described above correspond to the above-described lenses denoted with the same reference characters. First, a lens configuration common in the exemplary embodiments will be described.

The imaging optical system L0 of the exemplary embodiments includes, in order from the object side to the image side, the first lens unit L1, the second lens unit L2, and the third lens unit L3. The first lens unit L1 has a positive refractive power. The second lens unit L2 has a negative refractive power for focusing. The third lens unit L3 has a positive or a negative refractive power. The imaging optical system L0 includes the aperture stop SP positioned closer to the image side than the first lens unit L1. Further, the third lens unit L3 includes the first partial lens unit L31 having a positive or a negative refractive power, the second partial lens unit L32 having a negative refractive power, and the third partial lens unit L33 having a positive refractive power.

Then, correction of image blur (vibration compensation, image blur correction) of a captured image of when the imaging optical system L0 vibrates is performed in the second partial lens unit L32. That is, the correction of image blur is performed by movement of the second partial lens unit L32 in a direction (indicated by an arrow LT) having a component in a direction perpendicular to the optical axis.

In the first exemplary embodiment and the third exemplary embodiment, a diffractive optical element DOE is used in the first lens unit L1. The lens cross-sectional view illustrates the diffractive optical element DOE and a diffractive optical part (diffractive optical surface) D that configures a part of the diffractive optical element DOE. A diffraction order m of diffracted light in the exemplary embodiments among diffracted light caused in the diffractive optical part D, is 1. A design wavelength $\lambda_0$ is a wavelength of the d-line (587.56 nm).

The diffractive optical surface D provided in the imaging optical system L0 is not limited to one, and a plurality of the diffractive optical surfaces D may be used. Accordingly, favorable optical performance can be obtained. Further, the diffractive optical surface D is not limited to a spherical surface, and may be based on an aspheric surface. Further, the base material may be made of glass or plastic as long as the material transmits light. A phase $\varphi$ (H) in a distance H from the optical axis is expressed by the following expression:

$$\phi(H) = \left(2\pi \frac{m}{\lambda_0}\right) \cdot (C_2 \cdot H^2 + C_4 \cdot H^4 + C_6 \cdot H^6 \ldots + C_{2i} \cdot H^{2i}), \quad (a)$$

where a phase coefficient of the 2i-th order term of the shape of diffraction grating is $C_{2i}$, m is a diffraction order, and $\lambda_0$ is a reference wavelength.

An Abbe number $\nu_d$ of a refractive optical material of a lens, a prism, or the like is typically expressed by the following expression:

$$\nu_d = (N_d - 1)/(N_F - N_C) > 0 \quad (b)$$

where the refractive indicies of the wavelengths of the d-line, the C-line, and the F-line are $N_d$, $N_C$, and $N_F$, respectively.

Meanwhile, an Abbe number $\nu_d$ of the diffractive optical part is expressed by:

$$\nu_d = \lambda_d/(\lambda_F - \lambda_C) \quad (c),$$

where wavelengths of the d-line, the C-line, and the F-line are $\lambda_d$, $\lambda_C$, and $\lambda_F$, respectively, and $\nu_d = -3.453$.

Further, an anomalous partial dispersion ratio $\theta_{gF}$ of the diffractive optical part is expressed by:

$$\theta_{gF} = (\lambda_g - \lambda_F)/(\lambda_F - \lambda_C) \quad (d),$$

and $\theta_{gF} = 0.2956$.

Then, the anomalous partial dispersion ratio difference of the diffractive optical part becomes $\Delta\theta_{gF} = -0.35145$ from the following definitional expression:

$$\Delta\theta_{gF} = \theta_{gF} - (-1.61783 \times 10^{-3} \times \nu_d + 0.64146) \quad (e).$$

Accordingly, dispersion in an arbitrary wavelength has a counteraction to a refractive optical element. Further, a refractive power $\varphi_D$ of a paraxial first order diffracted light (m=1) in the reference wavelength of the diffractive optical part is expressed by $\varphi_D = -2 \cdot C_2$ from the above expression (a), which expresses the phase of the diffractive optical part, where the second order term coefficient is $C_2$. Accordingly, a focal length $f_{DOE}$ only with a diffraction component of the diffractive optical element DOE is obtained as follows:

$$f_{DOE} = \frac{1}{\phi_D} = -\frac{1}{2 \cdot C_2}. \quad (f)$$

Further, refractive power change of an arbitrary wavelength $\lambda$ to a reference wavelength $\lambda_0$ is obtained as follows:

$$\varphi_D' = (\lambda/\lambda_0) \times (-2 \cdot C_2) \quad (g)$$

where the arbitrary wavelength is $\lambda$ and the reference wavelength is $\lambda_0$.

Accordingly, as a characteristic of the diffractive optical part, large dispersion can be obtained with small paraxial refractive power change by changing the phase coefficient $C_2$ of the expression (a). This means that the chromatic aberrations are corrected without a substantial impact on a variety of aberrations other than the chromatic aberrations. Further, as for high-order coefficients including a phase coefficient $C_4$ and subsequent phase coefficients, the refractive power change of the diffractive optical part to the ray incident height change can provide an effect similar to the aspheric surface. At the same time, the refractive power change of the arbitrary wavelength $\lambda$ can be provided to the reference wavelength $\lambda_0$ according to the ray incident height change. Therefore, it is effective for the correction of the lateral chromatic aberration.

Further, according to the imaging optical system of the present invention, if the diffractive optical element is arranged in a surface where the on-axis ray passes through a high position from the optical axis when the on-axis ray passes through the lens surface, it is also effective for the correction of the axial chromatic aberration. The lens configurations in the exemplary embodiments will be described. Hereinafter, the lens units are arranged in order from the object side to the image side if not otherwise specified.

The imaging optical system L0 of the first exemplary embodiment illustrated in FIG. 1A will be described. The first lens unit L1 includes one biconvex-shaped positive lens, two meniscus positive lenses, a cemented lens in which a negative lens and a positive lens are cemented, and a meniscus positive lens. The cemented lens configures the diffractive optical element DOE. The diffractive optical part D that configures the diffractive optical element DOE is arranged on a cemented surface of the cemented lens.

The object side lens surfaces, which are in contact with the air, of the positive lens positioned closest to the object side and the cemented lens in the first lens unit L1 have an aspheric shape. Then, the second lens unit L2 includes one negative lens. Further, the aperture stop SP is arranged between the second lens unit L2 and the third lens unit L3. In the third lens unit L3, the first partial lens unit L31 includes two pairs of cemented lenses. The cemented lens on the object side is a cemented lens in which a negative lens and a positive lens are cemented.

The cemented lens on the image side is a cemented lens in which a positive lens and a negative lens are cemented. Further, the lens surface closest to the object side of the cemented lens on the image side has an aspheric shape. The second partial lens unit L32 includes one pair of cemented lens in which a positive lens and a negative lens are cemented, and one negative lens. The third partial lens unit L33 includes two pairs of cemented lenses. The cemented lens on the object side is a cemented lens in which a positive lens and a negative lens are cemented.

The cemented lens on the image side is a cemented lens in which one positive lens and two negative lenses are cemented. Further, the negative lens on the object side among the two negative lenses is a lens made of a ultraviolet (UV) curable resin material having optical characteristics illustrated in Table 1. Further, the lens surface on the object side of the positive lens closest to the object side in the third partial lens unit L33 has an aspheric shape. Focusing from an infinite-distance object to a near-distance object is performed by moving the second lens unit L2 on the optical axis toward the image plane side, as illustrated by an arrow.

The first partial lens unit L31 and the third partial lens unit L33 correspond to the partial lens units St. All of the positive lenses included in the partial lens units St satisfy the conditional expressions (3), (4), (5), and (8). Further, all of the negative lenses included in the first partial lens unit L31 and the third partial lens unit L33 satisfy the conditional expression (8).

Figure 2A:
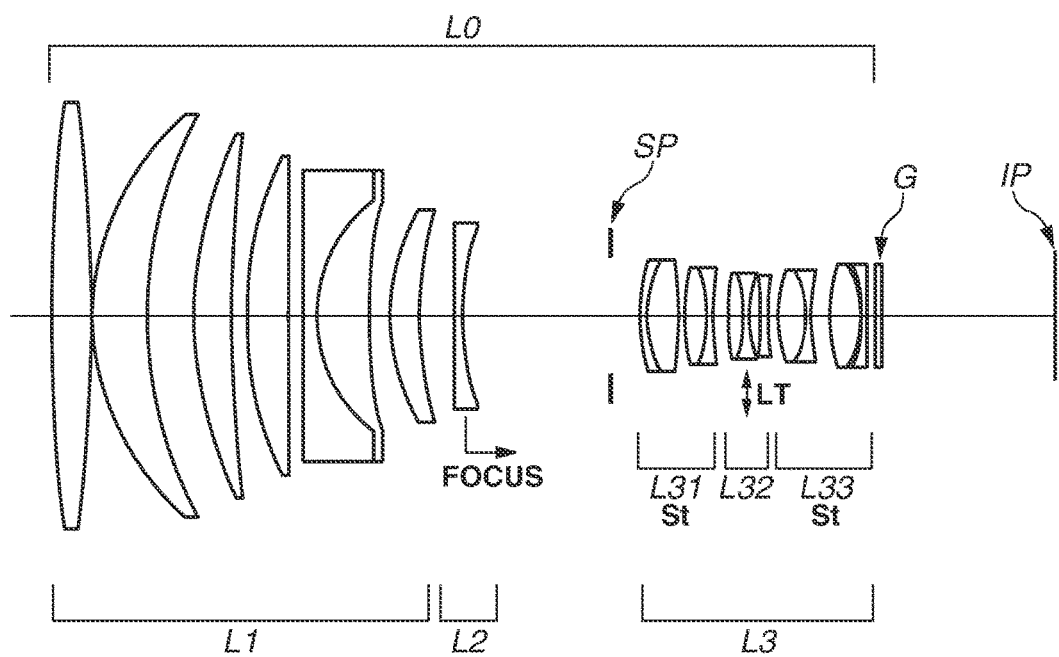
FIGS. 2A and 2B are diagrams illustrating a lens cross-sectional view and an aberration diagram, respectively, of an imaging optical system according to a second exemplary embodiment of the present invention, at a time of when focusing is performed on an infinite-distance object.
Figure 2B:
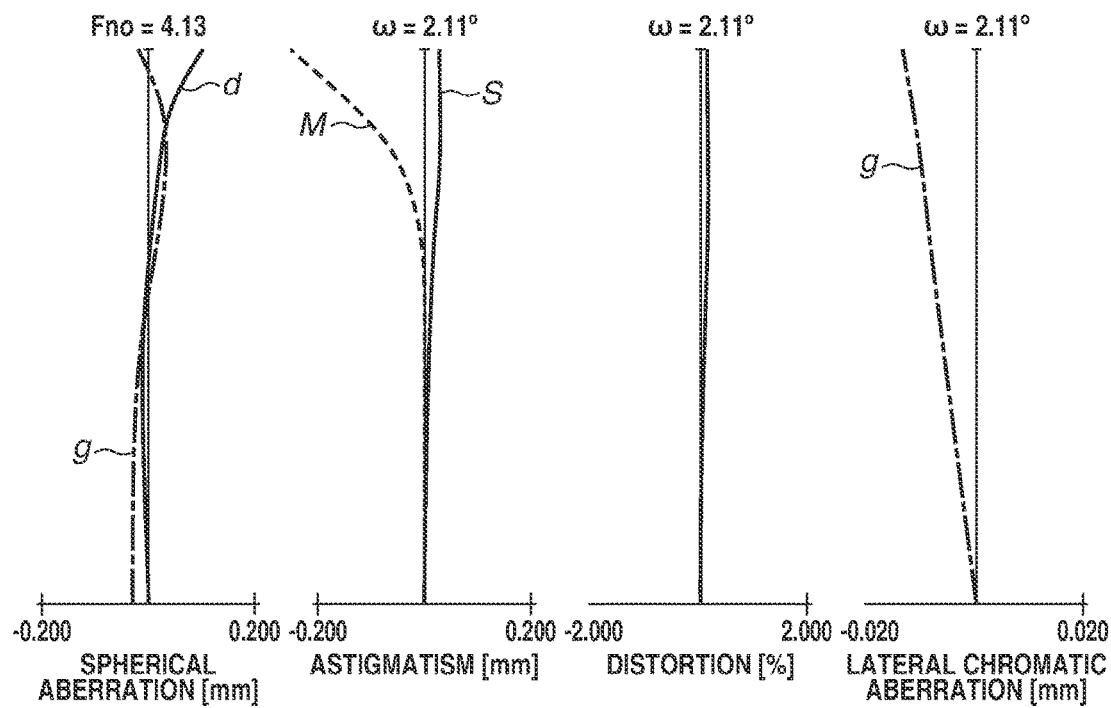

The imaging optical system L0 of the second exemplary embodiment illustrated in FIG. 2A will be described. The first lens unit L1 includes one biconvex-shaped positive lens, three meniscus positive lenses, a cemented lens in which a negative lens and a positive lens are cemented, and a meniscus positive lens.

The object side lens surfaces, which are in contact with the air, of the positive lens positioned closest to the object side and the cemented lens of the first lens unit L1 have an aspheric shape. The second lens unit L2 is the same as that of the first exemplary embodiment. Further, the position of the aperture stop SP is the same as that of the first exemplary embodiment. In the third lens unit L3, the first partial lens unit L31 is the same as that of the first exemplary embodiment. The second partial lens unit L32 is the same as that of the first exemplary embodiment. The third partial lens unit L33 includes two pairs of cemented lenses. The cemented lens on the object side is a cemented lens in which a positive lens and a negative lens are cemented. Further, the cemented lens on the image side is a cemented lens in which one positive lens and two negative lenses are cemented.

Further, the lens surface on the object side of the positive lens closest to the object side in the third partial lens unit L33 has an aspheric shape. Focusing from an infinite-distance object to a near-distance object is performed by moving the second lens unit L2 on the optical axis toward the image plane side. The configuration of the partial lens units St is the same as that of the first exemplary embodiment.

The imaging optical system L0 of the third exemplary embodiment illustrated in FIG. 3A will be described. The first lens unit L1 includes a biconvex-shaped positive lens, two meniscus positive lenses, a cemented lens in which a negative lens and a positive lens are cemented, and a biconvex-shaped positive lens. The cemented lens configures the diffractive optical element DOE. The diffractive optical part D that configures the diffractive optical element DOE is arranged on the cemented surface of the cemented lens.

The object side lens surfaces, which are in contact with the air, of the positive lens positioned closest to the object side and the cemented lens of the first lens unit L1 have an aspheric shape. The second lens unit L2 is the same as that of the first exemplary embodiment. The aperture stop SP is arranged between the first lens unit L1 and the second lens unit L2. In the third lens unit L3, the first partial lens unit L31 is the same as that of the first exemplary embodiment. The second partial lens unit L32 is the same as that of the first exemplary embodiment.

The third partial lens unit L33 includes two pairs of cemented lenses. The cemented lens on the object side is a cemented lens in which a positive lens and a negative lens are cemented. Further, the cemented lens on the image side is a cemented lens in which one positive lens and two negative lenses are cemented. The lens surface on the object side of the positive lens closest to the object side in the third partial lens unit L33 has an aspheric shape. Focusing from an infinite-distance object to a near-distance object is the same as that in the first exemplary embodiment. The configuration of the partial lens units St is the same as that of the first exemplary embodiment.

The imaging optical system L0 of the fourth exemplary embodiment illustrated in FIG. 4A will be described. The first lens unit L1 is the same as that of the first exemplary embodiment. The second lens unit L2 is the same as that of the first exemplary embodiment. The position of the aperture stop SP is the same as that of the first exemplary embodiment. In the third lens unit L3, the first partial lens unit L31 is the same as that of the first exemplary embodiment. The second partial lens unit L32 is the same as that of the first exemplary embodiment. The third partial lens unit L33 is the same as that of the first exemplary embodiment.

Focusing from an infinite-distance object to a near-distance object is the same as that in the first exemplary embodiment. The configuration of the partial lens units St is the same as that of the first exemplary embodiment. As described above, favorable exemplary embodiments of the present invention has been described. However, the present invention is not limited to these exemplary embodiments, and various modifications and changes can be made within the scope of the gist of the present invention.

An exemplary embodiment of an imaging apparatus (camera system) to which the imaging optical system of the present invention can be applied will be described with reference to FIG. 5. FIG. 5 is a schematic view of principal portions of a single-lens reflex camera. FIG. 5 illustrates an imaging lens 10 that includes any one of the imaging optical systems 1 of the first to fourth exemplary embodiments. The imaging optical system 1 is held by a lens barrel 2 as a holding member. A camera body 20 includes a quick return mirror 3 that reflects a light flux from the imaging lens 10 upward, a focusing plate 4 arranged in an image forming position of the imaging lens 10, and a pentagonal roof prism 5 that converts an inverse image formed on the focusing plate 4 into an erect image.

Further, the camera body 20 includes an eyepiece lens 6 for observing the erect image and the like. On a photosensitive surface 7, an image sensor (photoelectric conversion device), such as a CCD sensor, a CMOS sensor, or a silver-halide film is arranged for receiving an image of an object. At the time of imaging, the quick return mirror 3 is retracted from an optical path, and an image is formed on the photosensitive surface 7 by the imaging lens 10. By applying the imaging optical system of the first to fourth exemplary embodiments to an imaging apparatus, such as a photographic camera, a video camera, a digital still camera, and the like, a lightweight imaging apparatus having high optical performance is realized.

The imaging optical system of the present invention can be also applied to an imaging apparatus without a quick return mirror.

Hereinafter, numerical data corresponding to the first to fourth exemplary embodiments of the present invention will be described. In the numerical data, "i" indicates an order of a surface from the object side, "ri" indicates a radius of curvature of an i-th surface from the object side, "di" indicates an interval between the i-th surface and the (i+1)-th surface from the object side, "ndi" and "vdi" are an refractive index and an Abbe number of the i-th optical element, respectively. Further, "f", "Fno", and "2ω" indicate values of the focal length, the F-number, and the angle of view (degree), respectively, of the imaging optical system when focusing is performed on the infinite-distant object. Furthermore, "BF" indicates a value of a back focus in air.

Two surfaces closest to the image side in the numerical data are glass blocks of filters or the like. The diffractive optical element (diffractive surface) is expressed by giving a phase coefficient of a phase function of the above expression (a). The aspheric shape is expressed by the following expression:

$$X = \frac{\left(\frac{H^2}{R}\right)}{\left\{1 + \sqrt{1 - (1+K) \cdot \left(\frac{H}{R}\right)^2}\right\}} + A4 \cdot H^4 + A6 \cdot H^6 + A8 \cdot H^8 + A10 \cdot H^{10},$$

where an X axis is the optical axis direction, an H axis is a vertical direction to the optical axis, a light traveling direction is positive, R is a paraxial radius of curvature, k is an eccentricity, and A4, A6, A8, and A10 are aspheric coefficients. The expression "e-Z" represents "$10^{-Z}$". Table 1 illustrates material characteristics of the resin material of the negative lenses used in the cemented lens on the image side of the third partial lens unit L33 in the first and fourth exemplary embodiments. Further, Table 2 illustrates a relationship between the conditional expressions and the numerical values in the exemplary embodiments.

(Numerical Data 1)

| | f = 585.04 mm Fno = 4.12 2ω = 4.24 | | | | | | |
|---|---|---|---|---|---|---|---|
| Surface Number | r | d | nd | vd | Effective Diameter | θgF | ΔθgF |
| 1 (Aspheric Surface) | 296.316 | 17.00 | 1.48749 | 70.2 | 142.00 | | |
| 2 | −703.060 | 0.35 | | | 141.23 | | |
| 3 | 100.243 | 24.00 | 1.43387 | 95.1 | 132.10 | | |
| 4 | 357.151 | 33.70 | | | 128.58 | | |
| 5 | 105.918 | 14.30 | 1.43387 | 95.1 | 94.79 | | |
| 6 | 538.600 | 5.00 | | | 90.26 | | |
| 7 (Aspheric Surface) | 401.672 | 4.60 | 1.78800 | 47.4 | 83.40 | | |
| 8 (Diffraction) | 50.466 | 12.00 | 1.48749 | 70.2 | 70.61 | | |
| 9 | 81.341 | 7.20 | | | 67.82 | | |
| 10 | 77.901 | 11.62 | 1.43875 | 94.9 | 65.10 | | |
| 11 | 963.831 | 11.63 | | | 62.36 | | |
| 12 | 1088.734 | 3.00 | 1.51633 | 64.1 | 53.38 | | |
| 13 | 63.064 | 41.00 | | | 49.40 | | |
| 14 (Stop) | ∞ | 10.50 | | | 36.80 | Aperture Stop SP | |
| 15 | 62.968 | 2.00 | 1.91082 | 35.3 | 34.82 | 0.58243 | −0.00201 |
| 16 | 29.083 | 9.10 | 1.48749 | 70.2 | 33.15 | 0.53026 | 0.00244 |
| 17 | −161.066 | 2.15 | | | 32.92 | | |
| 18 (Aspheric Surface) | 84.047 | 7.00 | 1.65412 | 39.7 | 31.89 | 0.57403 | −0.00322 |
| 19 | −55.433 | 2.00 | 1.83481 | 42.7 | 30.87 | 0.56500 | −0.00735 |
| 20 | 129.764 | 4.85 | | | 29.73 | | |
| 21 | 98.870 | 5.00 | 1.84666 | 23.9 | 28.80 | | |
| 22 | −55.750 | 2.00 | 1.88300 | 40.8 | 28.30 | | |
| 23 | 41.653 | 3.58 | | | 26.96 | | |
| 24 | −251.141 | 2.50 | 1.88300 | 40.8 | 27.14 | | |
| 25 | 84.643 | 3.82 | | | 27.75 | | |

-continued

| | | | | | | | |
|---|---|---|---|---|---|---|---|
| 26 (Aspheric Surface) | 49.384 | 11.50 | 1.61340 | 44.3 | 30.84 | 0.56277 | −0.00709 |
| 27 | −26.123 | 2.00 | 1.59522 | 67.7 | 31.34 | 0.54380 | 0.01189 |
| 28 | 146.229 | 4.30 | | | 32.26 | | |
| 29 | 68.542 | 10.70 | 1.61340 | 44.3 | 34.03 | 0.56277 | −0.00709 |
| 30 | −33.756 | 0.10 | 1.63555 | 22.7 | 34.01 | 0.68947 | 0.08477 |
| 31 | −49.914 | 2.50 | 1.59522 | 67.7 | 34.03 | 0.54380 | 0.01189 |
| 32 | 487.552 | 2.50 | | | 34.00 | | |
| 33 | ∞ | 2.00 | 1.51633 | 64.1 | 34.32 | | |
| 34 | ∞ | 60.51 | | | 34.51 | | |
| Image Plane | ∞ | | | | | | |

Surface Number 16, 18, 26, 29 Positive Lens
Surface Number 15, 19, 27, 30, 31 Negative Lens
Defined by the expression: $\Delta\theta gF = \theta gF - (-1.61783 \times 10^{-3} \times vd + 0.64146)$

Aspheric Surface Data

First Surface

K = 0.00000e+000     A4 = −1.63748e−008     A6 = −2.17840e−013

Seventh Surface

K = 0.00000e+000     A4 = −2.59564e−008     A6 = −1.27898e−012

Eighteenth Surface

K = 0.00000e+000     A4 = 2.95580e−006     A6 = 1.61847e−009
A8 = 3.41190e−012

Twenty Sixth Surface

K = 0.00000e+000     A4 = −2.34099e−006     A6 = −2.87323e−010

Eighth Surface (Diffractive Surface)

C2 = −3.71782e−005     C4 = 6.35608e−011     C6 = −1.95114e−012
C8 = 6.06149e−016

| | |
|---|---|
| Focal Length | 585.04 |
| F-number | 4.12 |
| Half Angle of View (degree) | 2.12 |
| Image Height | 21.64 |
| Overall Lens Length | 335.33 |
| BF | 64.33 |
| Entrance Pupil Position | 780.12 |
| Exit Pupil Position | −70.16 |
| Front-side Principal Point Position | −1254.23 |
| Rear-side Principal Point Position | −524.53 |

Lens Unit Data

| Unit | Starting Surface | Focal Length | Lens Configuration Length | Front-side Principal Point Position | Rear-side Principal Point Position |
|---|---|---|---|---|---|
| 1 | 1 | 189.58 | 129.77 | −15.95 | −108.30 |
| 2 | 12 | −129.78 | 3.00 | 2.10 | 0.12 |
| 3 | 14 | −219.00 | 90.10 | 29.00 | −44.55 |
| 31 | 14 | 576.70 | 32.75 | −21.63 | −44.01 |
| 32 | 21 | −37.09 | 13.08 | 7.55 | −1.30 |
| 33 | 26 | 61.35 | 31.10 | 3.89 | −17.57 |
| G | 33 | ∞ | 2.00 | 0.66 | −0.66 |

Single Lens Data

| Lens | Starting Surface | Focal Length |
|---|---|---|
| 1 | 1 | 430.01 |
| 2 | 3 | 312.36 |
| 3 | 5 | 300.88 |
| 4 | 7 | −73.67 (value of single lens excluding diffractive optical element) |
| 5 | 8 | 241.91 (value of single lens excluding diffractive optical element) |
| 6 | 10 | 192.40 |
| 7 | 12 | −129.78 |
| 8 | 15 | −61.05 |
| 9 | 16 | 51.34 |
| 10 | 18 | 52.10 |
| 11 | 19 | −46.30 |

-continued

| | | |
|---|---|---|
| 12 | 21 | 42.74 |
| 13 | 22 | −26.74 |
| 14 | 24 | −71.45 |
| 15 | 26 | 29.57 |
| 16 | 27 | −37.07 |
| 17 | 29 | 38.40 |
| 18 | 30 | −164.47 |
| 19 | 31 | −75.94 |
| G | 33 | 0.00 |

(Numerical Data 2)

| f = 586.48 mm Fno = 4.13 2ω = 4.22 | | | | | | | |
|---|---|---|---|---|---|---|---|
| Surface Number | r | d | nd | vd | Effective Diameter | θgF | ΔθgF |
| 1 (Aspheric Surface) | 590.400 | 13.65 | 1.49700 | 81.5 | 142.00 | | |
| 2 | −540.113 | 0.35 | | | 141.65 | | |
| 3 | 90.753 | 18.21 | 1.43875 | 94.9 | 133.59 | | |
| 4 | 140.939 | 16.47 | | | 130.03 | | |
| 5 | 140.724 | 13.04 | 1.43875 | 94.9 | 121.12 | | |
| 6 | 507.046 | 5.00 | | | 119.06 | | |
| 7 | 128.623 | 14.37 | 1.43875 | 94.9 | 106.49 | | |
| 8 | 7925.270 | 5.00 | | | 103.65 | | |
| 9 (Aspheric Surface) | 7665.050 | 4.60 | 1.72916 | 54.7 | 96.25 | | |
| 10 | 50.682 | 17.60 | 1.43875 | 94.9 | 78.81 | | |
| 11 | 169.750 | 7.24 | | | 77.28 | | |
| 12 | 71.493 | 10.27 | 1.43875 | 94.9 | 71.44 | | |
| 13 | 132.816 | 11.63 | | | 68.10 | | |
| 14 | 2810.602 | 3.00 | 1.49700 | 81.5 | 62.55 | | |
| 15 | 94.919 | 50.65 | | | 58.89 | | |
| 16 (Stop) | ∞ | 10.50 | | | 40.10 | Aperture Stop SP | |
| 17 | 75.300 | 2.00 | 1.88300 | 40.8 | 37.17 | 0.56694 | −0.00857 |
| 18 | 39.936 | 10.98 | 1.51823 | 58.9 | 35.77 | 0.54608 | −0.00001 |
| 19 | −140.628 | 2.15 | | | 34.57 | | |
| 20 (Aspheric Surface) | 116.258 | 7.57 | 1.65412 | 39.7 | 32.47 | 0.57403 | −0.00322 |
| 21 | −45.607 | 2.00 | 1.88300 | 40.8 | 30.94 | 0.56694 | −0.00857 |
| 22 | 98.306 | 5.16 | | | 29.34 | | |
| 23 | 75.373 | 5.06 | 1.84666 | 23.9 | 27.99 | | |
| 24 | −54.470 | 2.00 | 1.88300 | 40.8 | 27.37 | | |
| 25 | 36.149 | 3.91 | | | 25.59 | | |
| 26 | −138.090 | 2.50 | 1.88300 | 40.8 | 25.70 | | |
| 27 | 108.246 | 3.54 | | | 26.27 | | |
| 28 (Aspheric Surface) | 43.972 | 9.51 | 1.61340 | 44.3 | 29.02 | 0.56277 | −0.00709 |
| 29 | −36.501 | 2.00 | 1.59522 | 67.7 | 29.45 | 0.54380 | 0.01189 |
| 30 | 69.973 | 6.32 | | | 30.10 | | |
| 31 | 58.673 | 10.57 | 1.61340 | 44.3 | 33.17 | 0.56277 | −0.00709 |
| 32 | −35.764 | 0.10 | 1.92286 | 18.9 | 33.30 | 0.64947 | 0.03858 |
| 33 | −52.939 | 2.50 | 1.59522 | 67.7 | 33.58 | 0.54380 | 0.01189 |
| 34 | −168.200 | 2.50 | | | 34.00 | | |
| 35 | ∞ | 2.00 | 1.51633 | 64.1 | 34.48 | | |
| 36 | ∞ | 59.28 | | | 34.67 | | |
| Image Plane | ∞ | | | | | | |

Surface Number 18, 20, 28, 31 Positive Lens
Surface Number 17, 21, 29, 32, 33 Negative Lens
Defined by the expression: $\Delta\theta gF = \theta gF - (-1.61783 \times 10^{-3} \times vd + 0.64146)$ Aspheric Surface Data

| First Surface | | |
|---|---|---|
| K = 0.00000e+000 | A4 = −8.49144e−009 | A6 = −1.55397e−013 |

| Ninth Surface | | |
|---|---|---|
| K = 0.00000e+000 | A4 = −3.65911e−008 | A6 = −1.65327e−012 |

| Twentieth Surface | | |
|---|---|---|
| K = 0.00000e+000 | A4 = 1.99203e−006 | A6 = 8.49947e−010 |
| A8 = 2.10290e−012 | | |

-continued

| Twenty Eighth Surface | | |
|---|---|---|
| K = 0.00000e+000 | A4 = −2.90452e−006 | A6 = 4.02307e−010 |

| | |
|---|---|
| Focal Length | 586.48 |
| F-number | 4.13 |
| Half Angle of View (degree) | 2.11 |
| Image Height | 21.64 |
| Overall Lens Length | 342.54 |
| BF | 63.10 |
| Entrance Pupil Position | 706.35 |
| Exit Pupil Position | −77.45 |
| Front-side Principal Point Position | −1222.76 |
| Rear-side Principal Point Position | −527.19 |

Lens Unit Data

| Unit | Starting Surface | Focal Length | Lens Configuration Length | Front-side Principal Point Position | Rear-side Principal Point Position |
|---|---|---|---|---|---|
| 1 | 1 | 200.05 | 125.81 | −19.58 | −102.85 |
| 2 | 14 | −197.73 | 3.00 | 2.07 | 0.07 |
| 3 | 16 | −163.87 | 92.85 | 26.83 | −54.39 |
| 31 | 16 | −1104.51 | 35.20 | 159.59 | 117.49 |
| 32 | 23 | −36.11 | 13.47 | 8.12 | −1.21 |
| 33 | 28 | 60.82 | 30.99 | 6.93 | −16.30 |
| G | 35 | ∞ | 2.00 | 0.66 | −0.66 |

Single Lens Data

| Lens | Starting Surface | Focal Length |
|---|---|---|
| 1 | 1 | 569.83 |
| 2 | 3 | 523.01 |
| 3 | 5 | 439.18 |
| 4 | 7 | 297.83 |
| 5 | 9 | −69.99 |
| 6 | 10 | 157.58 |
| 7 | 12 | 335.77 |
| 8 | 14 | −197.73 |
| 9 | 17 | −98.93 |
| 10 | 18 | 61.29 |
| 11 | 20 | 51.02 |
| 12 | 21 | −35.05 |
| 13 | 23 | 38.03 |
| 14 | 24 | −24.36 |
| 15 | 26 | −68.40 |
| 16 | 28 | 34.04 |
| 17 | 29 | −40.02 |
| 18 | 31 | 37.83 |
| 19 | 32 | −119.78 |
| 20 | 33 | −130.85 |
| G | 35 | 0.00 |

(Numerical Data 3)

| f = 585.00 mm Fno = 4.12 2ω = 4.24 | | | | | | | |
|---|---|---|---|---|---|---|---|
| Surface Number | r | d | nd | vd | Effective Diameter | θgF | ΔθgF |
| 1 (Aspheric Surface) | 292.756 | 17.00 | 1.48749 | 70.2 | 142.00 | | |
| 2 | −1000.000 | 0.35 | | | 141.09 | | |
| 3 | 104.991 | 24.00 | 1.43387 | 95.1 | 133.27 | | |
| 4 | 437.232 | 33.70 | | | 129.96 | | |
| 5 | 112.064 | 14.30 | 1.43387 | 95.1 | 96.78 | | |
| 6 | 633.926 | 5.00 | | | 92.43 | | |
| 7 (Aspheric Surface) | 803.667 | 4.60 | 1.78800 | 47.4 | 86.89 | | |
| 8 (Diffraction) | 59.375 | 12.00 | 1.48749 | 70.2 | 75.34 | | |
| 9 | 105.424 | 7.20 | | | 72.79 | | |
| 10 | 131.211 | 11.62 | 1.43875 | 94.9 | 70.54 | | |

-continued

| | | | | | | | |
|---|---|---|---|---|---|---|---|
| 11 | −326.431 | 5.63 | | | 68.29 | | |
| 12 (Stop) | ∞ | 6.00 | | | 62.44 | Aperture Stop SP | |
| 13 | 464.523 | 3.00 | 1.51633 | 64.1 | 57.03 | | |
| 14 | 62.415 | 61.33 | | | 52.69 | | |
| 15 | 141.781 | 2.00 | 1.80610 | 33.3 | 32.47 | 0.58811 | 0.00047 |
| 16 | 26.582 | 9.10 | 1.61340 | 44.3 | 30.68 | 0.56277 | −0.00709 |
| 17 | 472.868 | 2.15 | | | 29.89 | | |
| 18 (Aspheric Surface) | 64.830 | 7.00 | 1.74950 | 35.3 | 28.98 | 0.58180 | −0.00249 |
| 19 | −80.105 | 2.00 | 1.91082 | 35.3 | 27.51 | 0.58243 | −0.00201 |
| 20 | 203.085 | 4.85 | | | 27.12 | | |
| 21 | 70.969 | 5.00 | 1.84666 | 23.9 | 26.67 | | |
| 22 | −73.253 | 2.00 | 1.88300 | 40.8 | 26.12 | | |
| 23 | 40.368 | 3.58 | | | 25.05 | | |
| 24 | −372.434 | 2.50 | 1.88300 | 40.8 | 25.31 | | |
| 25 | 62.834 | 3.82 | | | 25.84 | | |
| 26 (Aspheric Surface) | 42.207 | 11.50 | 1.65412 | 39.7 | 29.21 | 0.57403 | −0.00322 |
| 27 | −26.269 | 2.00 | 1.69350 | 50.8 | 29.61 | 0.55458 | −0.00469 |
| 28 | 117.457 | 4.30 | | | 30.52 | | |
| 29 | 64.168 | 10.70 | 1.61340 | 44.3 | 32.67 | 0.56277 | −0.00709 |
| 30 | −30.251 | 0.10 | 1.80809 | 22.8 | 32.80 | 0.63070 | 0.02607 |
| 31 | −49.638 | 2.50 | 1.59522 | 67.7 | 33.15 | 0.54380 | 0.01189 |
| 32 | −6759.918 | 2.50 | | | 33.65 | | |
| 33 | ∞ | 2.00 | 1.51633 | 64.1 | 34.03 | | |
| 34 | ∞ | 60.50 | | | 34.23 | | |
| Image Plane | ∞ | | | | | | |

Surface Number 16, 18, 26, 29 Positive Lens
Surface Number 15, 19, 27, 30, 31 Negative Lens
Defined by the expression: $\Delta\theta gF = \theta gF - (-1.61783 \times 10^{-3} \times vd + 0.64146)$ Aspheric Surface Data

First Surface

K = 0.00000e+000    A4 = −1.34793e−008    A6 = −2.97171e−013

Seventh Surface

K = 0.00000e+000    A4 = −4.27562e−008    A6 = 2.33317e−012

Eighteenth Surface

K = 0.00000e+000    A4 = 2.61319e−006    A6 = 9.05984e−010
A8 = 2.71458e−012

Twenty Sixth Surface

K = 0.00000e+000    A4 = −2.12073e−006    A6 = 8.29672e−010

Eighth Surface (Diffractive Surface)

C2 = −4.94736e−005    C4 = 9.80877e−009    C6 = −1.63242e−012
C8 = 7.20466e−016

| | |
|---|---|
| Focal Length | 585.00 |
| F-number | 4.12 |
| Half Angle of View (degree) | 2.12 |
| Image Height | 21.64 |
| Overall Lens Length | 345.15 |
| BF | 64.32 |
| Entrance Pupil Position | 253.38 |
| Exit Pupil Position | −96.01 |
| Front-side Principal Point Position | −1348.24 |
| Rear-side Principal Point Position | −524.50 |

Lens Unit Data

| Unit | Starting Surface | Focal Length | Lens Configuration Length | Front-side Principal Point Position | Rear-side Principal Point Position |
|---|---|---|---|---|---|
| 1 | 1 | 189.41 | 135.40 | −2.52 | −108.84 |
| 2 | 13 | −140.00 | 3.00 | 2.29 | 0.31 |
| 3 | 15 | −189.04 | 79.60 | 25.86 | −32.91 |
| 31 | 15 | 392.44 | 22.25 | 0.18 | −13.44 |
| 32 | 21 | −38.58 | 13.08 | 8.88 | −0.19 |
| 33 | 26 | 64.54 | 31.10 | 1.57 | −19.41 |
| G | 33 | ∞ | 2.00 | 0.66 | −0.66 |

-continued

| | Single Lens Data | |
|---|---|---|
| Lens | Starting Surface | Focal Length |
| 1 | 1 | 466.55 |
| 2 | 3 | 311.64 |
| 3 | 5 | 311.17 |
| 4 | 7 | −81.58 (value of single lens excluding diffractive optical element) |
| 5 | 8 | 256.90 (value of single lens excluding diffractive optical element) |
| 6 | 10 | 214.98 |
| 7 | 13 | −140.00 |
| 8 | 15 | −40.90 |
| 9 | 16 | 45.56 |
| 10 | 18 | 48.82 |
| 11 | 19 | −62.86 |
| 12 | 21 | 43.26 |
| 13 | 22 | −29.23 |
| 14 | 24 | −60.72 |
| 15 | 26 | 26.51 |
| 16 | 27 | −30.78 |
| 17 | 29 | 35.03 |
| 18 | 30 | −96.07 |
| 19 | 31 | −84.02 |
| G | 33 | 0.00 |

(Numerical Data 4)

| | | f = 595.94 mm Fno = 4.20 2ω = 4.16 | | | | | |
|---|---|---|---|---|---|---|---|
| Surface Number | r | d | nd | νd | Effective Diameter | θgF | ΔθgF |
| 1 (Aspheric Surface) | 275.346 | 14.48 | 1.48749 | 70.2 | 142.00 | | |
| 2 | −938.384 | 0.35 | | | 141.54 | | |
| 3 | 96.394 | 23.98 | 1.43387 | 95.1 | 132.31 | | |
| 4 | 307.334 | 33.44 | | | 128.98 | | |
| 5 | 96.017 | 14.97 | 1.43387 | 95.1 | 94.73 | | |
| 6 | 494.132 | 3.38 | | | 90.39 | | |
| 7 (Aspheric Surface) | 334.434 | 4.60 | 1.78800 | 47.4 | 84.95 | | |
| 8 (Diffraction) | 47.419 | 11.30 | 1.48749 | 70.2 | 70.59 | | |
| 9 | 90.160 | 7.00 | | | 69.16 | | |
| 10 | 82.205 | 9.16 | 1.43875 | 94.9 | 65.88 | | |
| 11 | 473.616 | 11.51 | | | 63.91 | | |
| 12 | 499.184 | 3.00 | 1.51633 | 64.1 | 54.85 | | |
| 13 | 63.013 | 41.00 | | | 50.66 | | |
| 14 (Stop) | ∞ | 10.50 | | | 36.54 | Aperture Stop SP | |
| 15 | 89.303 | 2.00 | 1.83400 | 37.2 | 33.37 | 0.57754 | −0.00379 |
| 16 | 23.677 | 6.62 | 1.61340 | 44.3 | 31.35 | 0.56277 | −0.00709 |
| 17 | 84.021 | 1.00 | | | 31.07 | | |
| 18 (Aspheric Surface) | 56.174 | 9.63 | 1.61340 | 44.3 | 31.09 | 0.56277 | −0.00709 |
| 19 | −40.724 | 2.00 | 1.83400 | 37.2 | 29.95 | 0.57754 | −0.00379 |
| 20 | −318.194 | 6.22 | | | 29.50 | | |
| 21 | 124.179 | 4.45 | 1.84666 | 23.9 | 28.01 | | |
| 22 | −54.401 | 2.00 | 1.88300 | 40.8 | 27.63 | | |
| 23 | 42.976 | 2.99 | | | 26.53 | | |
| 24 | −326.606 | 2.50 | 1.88300 | 40.8 | 26.67 | | |
| 25 | 102.397 | 3.82 | | | 27.25 | | |
| 26 (Aspheric Surface) | 49.210 | 20.91 | 1.61340 | 44.3 | 30.13 | 0.56277 | −0.00709 |
| 27 | −31.252 | 2.00 | 1.59522 | 67.7 | 31.66 | 0.54380 | 0.01189 |
| 28 | 144.278 | 4.30 | | | 32.34 | | |
| 29 | 68.657 | 9.44 | 1.61340 | 44.3 | 33.95 | 0.56277 | −0.00709 |
| 30 | −41.983 | 0.10 | 1.63555 | 22.7 | 33.87 | 0.68947 | 0.08477 |
| 31 | −67.510 | 2.50 | 1.59522 | 67.7 | 33.86 | 0.54380 | 0.01189 |
| 32 | 297.661 | 2.50 | | | 34.00 | | |

-continued

| | | | | | |
|---|---|---|---|---|---|
| 33 | ∞ | 2.00 | 1.51633 | 64.1 | 34.29 |
| 34 | ∞ | 61.62 | | | 34.48 |
| Image Plane | ∞ | | | | |

Surface Number 16, 18, 26, 29 Positive Lens
Surface Number 15, 19, 27, 30, 31 Negative Lens
Defined by the expression: $\Delta\theta gF = \theta gF - (-1.61783 \times 10^{-3} \times \nu d + 0.64146)$

Aspheric Surface Data

First Surface

| | | |
|---|---|---|
| K = 0.00000e+000 | A4 = −1.31092e−008 | A6 = −3.24074e−013 |

Seventh Surface

| | | |
|---|---|---|
| K = 0.00000e+000 | A4 = −3.77158e−008 | A6 = 1.17006e−013 |

Eighteenth Surface

| | | |
|---|---|---|
| K = 0.00000e+000 | A4 = 3.81334e−006 | A6 = 2.28035e−009 |
| A8 = 5.10215e−012 | | |

Twenty Sixth Surface

| | | |
|---|---|---|
| K = 0.00000e+000 | A4 = −2.61368e−006 | A6 = −4.18266e−010 |

Eighth Surface (Diffractive Surface)

| | | |
|---|---|---|
| C2 = −3.78026e−005 | C4 = 1.11813e−009 | C6 = −3.96337e−012 |
| C8 = 1.83305e−015 | | |

| | |
|---|---|
| Focal Length | 595.94 |
| F-number | 4.20 |
| Half Angle of View (degree) | 2.08 |
| Image Height | 21.64 |
| Overall Lens Length | 336.61 |
| BF | 65.44 |
| Entrance Pupil Position | 743.52 |
| Exit Pupil Position | −76.85 |
| Front-side Principal Point Position | −1225.16 |
| Rear-side Principal Point Position | −534.31 |

Lens Unit Data

| Unit | Starting Surface | Focal Length | Lens Configuration Length | Front-side Principal Point Position | Rear-side Principal Point Position |
|---|---|---|---|---|---|
| 1 | 1 | 184.78 | 122.67 | −17.83 | −103.37 |
| 2 | 12 | −140.00 | 3.00 | 2.27 | 0.29 |
| 3 | 14 | −185.77 | 97.49 | 15.77 | −62.31 |
| 31 | 14 | 946.73 | 31.75 | 0.37 | −23.15 |
| 32 | 21 | −39.00 | 11.94 | 6.29 | −1.59 |
| 33 | 26 | 65.48 | 39.25 | 4.40 | −22.44 |
| G | 33 | ∞ | 2.00 | 0.66 | −0.66 |

Single Lens Data

| Lens | Starting Surface | Focal Length |
|---|---|---|
| 1 | 1 | 438.40 |
| 2 | 3 | 312.94 |
| 3 | 5 | 271.59 |
| 4 | 7 | −70.62 (value of single lens excluding diffractive optical element) |
| 5 | 8 | 188.83 (value of single lens excluding diffractive optical element) |
| 6 | 10 | 225.10 |
| 7 | 12 | −140.00 |
| 8 | 15 | −39.18 |
| 9 | 16 | 51.59 |
| 10 | 18 | 40.00 |
| 11 | 19 | −56.18 |
| 12 | 21 | 45.20 |
| 13 | 22 | −26.93 |
| 14 | 24 | −88.05 |
| 15 | 26 | 34.58 |
| 16 | 27 | −42.97 |
| 17 | 29 | 43.90 |

| 18 | 30 | −174.97 |
| 19 | 31 | −92.22 |
| G | 33 | 0.00 |

TABLE 1

|  | UV Curable Resin |
| --- | --- |
| d-line Refractive Index | 1.63555 |
| g-line Refractive Index | 1.67532 |
| C-line Refractive Index | 1.62807 |
| F-line Refractive Index | 1.65604 |
| $\nu_d$ | 22.7 |
| $\theta_{gF}$ | 0.68947 |
| $\Delta\theta_{gF}$ | 0.08477 |

TABLE 2

|  | First Exemplary Embodiment | Second Exemplary Embodiment | Third Exemplary Embodiment | Fourth Exemplary Embodiment |
| --- | --- | --- | --- | --- |
| Conditional Expression (1) | −1.46 | −1.01 | −1.35 | −1.32 |
| Conditional Expression (2) | 5.38 | 5.02 | 5.23 | 5.71 |
| Conditional Expression (3) | −0.00612 | −0.00617 | −0.00736 | −0.00917 |
| Conditional Expressions (4) and (5) (Ndp) | 1.48749 1.65412 1.61340 1.61340 | 1.51823 1.65412 1.61340 1.61340 | 1.61340 1.74950 1.65412 1.61340 | 1.61340 1.61340 1.61340 1.61340 |
| Conditional Expression (6) | −8.24 | −10.49 | −9.56 | −10.35 |
| Conditional Expression (7) | 2.58 | 2.90 | 2.53 | 2.95 |
| Conditional Expression (8) | 0.417 | 0.720 | 1.204 | 0.672 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-103559, filed May 21, 2015, which is hereby incorporated by reference herein in its entirety.

What is claimed is:

1. An imaging optical system comprising, in order from an object side to an image side,
   a first lens unit which has a positive refractive power,
   a second lens unit which has a negative refractive power and moves in an optical axis direction in focusing,
   a third lens unit which has a positive or a negative refractive power, and
   an aperture stop arranged in a position closer to the image side than the first lens unit,
   wherein the third lens unit includes one or more partial lens units which are immovable during focusing and during image blur correction, each having a positive or a negative refractive power,
   wherein each of the one or more partial lens units includes one or more positive lenses, and
   wherein the following conditional expressions are satisfied:

$-2.5 < f_1/f_2 < -1$, $3.0 < f^2/(f_1 \times L) < 8.0$, and $$-0.0150 < \sum_{i=1}^{n} \Delta\theta_{gFPi} \times \frac{f}{f_{Pi} \times \nu_{dPi}} < -0.0040,$$

where a focal length of the first lens unit is $f_1$, a focal length of the second lens unit is $f_2$, an overall lens length is L, a focal length of the imaging optical system when focused on an infinite-distance object is f, a focal length of an i-th positive lens in an i-th position, among all of the one or more positive lenses, counted in order from the object side to the image side is $f_{Pi}$, an Abbe number and an anomalous partial dispersion ratio difference of a material for the i-th positive lens are $\nu_{dPi}$ and $\Delta\theta_{gFPi}$, respectively, and a total number of the one or more positive lenses included in the one or more partial lens units is n.

2. The imaging optical system according to claim 1, wherein a conditional expression:

$-0.014 \times \nu_{dP} + 2.16 < N_{dP} < -0.014 \times \nu_{dP} + 2.52$ is satisfied,
   where a refractive index of a material for the one or more positive lenses included in the partial lens units is $N_d$, and an Abbe number of the material is $\nu_{dP}$.

3. The imaging optical system according to claim 1, wherein a conditional expression:

$1.45 < N_{dP}p < 1.76$ is satisfied, where a refractive index of a material for the one or more positive lenses included in the partial lens units is $N_{dP}$.

4. The imaging optical system according to claim 1, wherein a conditional expression:

$-15.0 < f^2/(f_1 \times f_3) < -4.0$ is satisfied, where a focal length of the third lens unit is $f_3$.

5. The imaging optical system according to claim 1, wherein a conditional expression:

$2.0 < f^2/(f_{12} \times L) < 10.0$ is satisfied, where a combined focal length of the first lens unit and the second lens unit when the optical system is focused on an infinite-distance object is $f_{12}$.

6. The imaging optical system according to claim 1, wherein at least one of the partial lens units includes one or more negative lenses, and satisfies a conditional expression:

$$0.10 < \frac{\sum_{i=1}^{n} \Delta\theta_{gFPi} \times \frac{f}{f_{Pi} \times v_{dPi}}}{\sum_{j=1}^{m} \Delta\theta_{gFNj} \times \frac{f}{f_{Nj} \times v_{dNj}}} \times 2.00,$$

where a focal length of a j-th negative lens in a j-th position, among the one or more negative lenses, counted in order from the object side to the image side is $f_{Nj}$, a Abbe number and an anomalous partial dispersion ratio difference of a material for the j-th negative lens are $v_{dPj}$ and $\Delta\theta_{gFPj}$, respectively, and a total number of the one or more negative lenses included in the one or more partial lens units is m.

7. The imaging optical system according to claim 1, wherein the third lens unit includes, in order from the object side to the image side, a first partial lens unit, a second partial lens unit, and a third partial lens unit, and
  wherein the first partial lens unit and the third partial lens unit are immovable during focusing and during image blur correction, and the second partial lens unit moves in a direction having a direction component which is perpendicular to the optical axis in image blur correction.

8. An imaging apparatus comprising:
  the imaging optical system according to claim 1; and
  an image sensor configured to receive an image formed by the imaging optical system.

* * * * *